US008782869B2

(12) United States Patent
Dolci et al.

(10) Patent No.: US 8,782,869 B2
(45) Date of Patent: Jul. 22, 2014

(54) UNLOCKING TOOL FOR MALE CONNECTOR

(75) Inventors: Dominic E. Dolci, Oakland, CA (US); Alexander M. Kwan, Los Altos Hills, CA (US); Cesar Lozano Villarreal, Sunnyvale, CA (US); Daniele G. De Iuliis, San Francisco, CA (US); James G. Smeenge, Los Gatos, CA (US); Ricardo A. Mariano, Hayward, CA (US); Victoria A. Spielmann, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 13/109,944

(22) Filed: May 17, 2011

(65) Prior Publication Data

US 2012/0291255 A1 Nov. 22, 2012

(51) Int. Cl.
*B23P 19/00* (2006.01)

(52) U.S. Cl.
USPC .............................. 29/426.6; 29/764; 439/152

(58) Field of Classification Search
USPC .............. 29/426.6, 764, 527.4; 439/152–160, 439/266–270, 304, 345–373, 518
See application file for complete search history.

(56) References Cited

U.S. PATENT DOCUMENTS 3,844,013 A 10/1974 Hall, Jr.
3,852,864 A * 12/1974 Kirk, Jr. .......................... 29/764
4,196,954 A * 4/1980 Collignon et al. ............ 439/152
4,310,211 A * 1/1982 Bunnell et al. ................ 439/358
4,723,361 A * 2/1988 Carlson et al. .................. 29/764
5,154,629 A * 10/1992 Carver et al. ................. 439/352
5,480,318 A 1/1996 Garrison
5,713,752 A * 2/1998 Leong et al. .................. 439/358
5,782,646 A 7/1998 Broadfield et al.
5,947,771 A 9/1999 Bethurum
5,951,317 A 9/1999 Tracy et al.
6,167,602 B1 * 1/2001 Yang et al. ....................... 29/278
6,986,678 B1 1/2006 Di-Nardo et al.

(Continued)

FOREIGN PATENT DOCUMENTS

CN 201336489 Y 10/2009
CN 101630796 A 1/2010

(Continued)

OTHER PUBLICATIONS

Partial International Search Report for International Application No. PCT/US2012/038186, mailed on Aug. 10, 2012, 7 pages.

(Continued)

*Primary Examiner* — Jacob Cigna
(74) *Attorney, Agent, or Firm* — Kilpatrick Townsend & Stockton LLP

(57) ABSTRACT

A connector of a cable (e.g., a 30-pin connector) can be used to facilitate various security-related and other functionalities. For example, a connector can include security locking mechanisms for engaging or locking the connector to a portable electronic device. A connector can additionally support the transmission of security signals, data signals, power, and/or the like. An unlocking tool can be used to disengage a connector locked to the portable electronic device. More specifically, the unlocking tool can be applied to a connector and cause the locking mechanisms of the connector to release such that the connector can be freely disconnected from a connected portable electronic device.

11 Claims, 22 Drawing Sheets

(56) References Cited

U.S. PATENT DOCUMENTS

| | | | | |
|---|---|---|---|---|
| 7,275,953 | B2 | 10/2007 | Brown et al. | |
| 7,578,691 | B2 * | 8/2009 | Weksler et al. | 439/347 |
| 7,850,476 | B2 * | 12/2010 | Good | 439/358 |
| 8,287,191 | B2 * | 10/2012 | Nielson et al. | 385/76 |
| 2004/0137779 | A1 * | 7/2004 | Wei | 439/358 |
| 2005/0186830 | A1 | 8/2005 | Wu | |
| 2006/0019526 | A1 | 1/2006 | Jeon | |
| 2007/0128923 | A1 | 6/2007 | Brown et al. | |
| 2009/0007609 | A1 | 1/2009 | Obenshain | |
| 2009/0180243 | A1 | 7/2009 | Lynch et al. | |
| 2009/0301761 | A1 | 12/2009 | Wu | |
| 2009/0318004 | A1 * | 12/2009 | Cours | 439/304 |
| 2010/0279547 | A1 | 11/2010 | Chang | |
| 2010/0291783 | A1 | 11/2010 | Chang | |
| 2012/0295462 | A1 | 11/2012 | Villarreal et al. | |

FOREIGN PATENT DOCUMENTS

| | | | |
|---|---|---|---|
| DE | 3015138 | A1 | 10/1981 |
| DE | 3440043 | A1 | 5/1986 |
| DE | 4214016 | A1 * | 11/1993 |
| EP | 0631348 | A2 | 12/1994 |
| EP | 0844695 | B1 | 5/1998 |
| EP | 2207242 | A2 | 7/2010 |
| JP | 2003317866 | | 11/2003 |
| WO | 2010/097603 | A1 | 9/2010 |

OTHER PUBLICATIONS

International Search Report and Written Opinion for International Application No. PCT/US2012/038186, mailed on Oct. 22, 2012, 15 pages.

Combined Search and Examination Report for Great Britain Patent Application No. GB1208580.9, mailed on Dec. 6, 2012, 6 pages.

Non-Final Office Action for U.S. Appl. No. 13/109,933, mailed on Sep. 5, 2012, 13 pages.

International Preliminary Report on Patentability for International PCT Application No. PCT/US2012/038186, mailed Nov. 28, 2013, 10 pages.

* cited by examiner

Male Connector
400

Cross Section View

Side View

Top View

Male Connector
400

Angled View

Cross Section View

Unlocking Tool
800

Cross Section View

Unlocking Tool
800

Bottom View

Unlocking Tool
800

Angled View

Cross Section View

User Initiation Portion
802

Cross Section View

UNLOCKING TOOL FOR MALE CONNECTOR

BACKGROUND

The present disclosure relates generally to the securing of portable electronic devices and more particularly to connectors and tools for locking and unlocking portable electronic devices.

Electronic computing devices have been in use for several decades. In some instances, electronic computing devices can have weight and size characteristics such that the devices are portable or easily moved. Examples of portable electronic devices include, for example, laptop computers, mobile phones, smartphones, tablet devices, portable multimedia players, and/or the like. Such devices can be used for performing a wide variety of tasks, from the simple to the most complex.

In many instances, portable electronic devices can be connected to cables in order to enable various functionalities. For example, a portable electronic device can use a cable to communicate with other devices. As another example, a portable electronic device can use a cable to receive power. As still another example, a portable electronic device can be attached to a cable such that the device is tethered to a fixture. In doing so, the portable electronic device can be secured from theft.

In typical retail environments, portable electronic devices on display for purchase are usually connected to a number of different cables. Illustratively, a portable electronic device can be connected to a first cable for receiving power and a second cable for securing the device to a fixture. Use of multiple cables, however is not optimal from a user experience perspective. In particular, portable electronic devices, under normal use conditions, are not typically connected to separate security cables. Because security requirements in retail environments necessitate such cables, simulation of normal use conditions within such environments can be inaccurate. For example, security cables can restrict device movement, affect device weight, adversely impact retail display aesthetics, and/or the like.

SUMMARY

According to various embodiments of the present invention, a connector of a cable (e.g., a 30-pin connector) can be used to facilitate various security-related and other functionalities. In some embodiments, for example, a connector can include a security locking mechanism for engaging or locking the connector to a portable electronic device. A connector can additionally support the transmission of security signals, data signals, power, and/or the like.

According to some embodiments, a separate unlocking tool can be used to disengage the connector from a portable electronic device. More specifically, the unlocking tool can be applied to the connector and cause the locking mechanism of the connector to release such that the connector can be freely disconnected from the portable electronic device.

In one embodiment, a connector can include a plug body and a plug housing extending from the plug body. The plug housing can be inserted within a corresponding receptacle connector during a mating event. In some embodiments, the plug housing can include a number of pin or contact locations. One or more of the pin locations can each include a pin, which can be electrically coupled to a pin or contact of the receptacle connector.

The connector can additionally include one or more locking mechanisms for locking the connector to the receptacle connector. For example, the locking mechanism can include one or more hooks that can engage with the receptacle connector during mating. In particular, the hooks can enter inner cavities of the receptacle connector, which can cause the connector to become locked to the receptacle connector.

The connector can furthermore include one or more release points (e.g., lower portions of the hooks). Application of a force on the release points can cause the locking mechanisms to become disengaged such that the connector and receptacle connector can become unlocked from one another. The release points can be accessible via one or more access pathways situated on the sides of the connector.

In another embodiment, an unlocking tool can include a housing. The housing can include a cavity for receiving a connector. In particular, the cavity can have dimensions such that the connector can be slid into the cavity. The connector can be received by the housing through a top opening of the housing. The housing can further include a front opening through which cabling connected to the connector can exit the housing.

The unlocking tool can further include one or more user initiation portions. The lower portions of the user initiation portions can be attached to channels within the cavity of the unlocking tool's housing. The upper portions of the user initiation portion can extend along the sides of the housing and exit via side openings of the housing. The segments of the user initiation portion disposed on the outside of the housing can be configured to receive a user applied force or pressure. The user initiation portions can additionally include pins situated at their ends. The pins can include a length and diameter such that the pins can enter the access pathways of a connector and contact the release points of the connector's locking mechanism such that the locking mechanism releases from a connected receptacle connector.

Various embodiments can incorporate one or more of these and other features described herein. A better understanding of the nature and advantages of the present invention can be gained by reference to the following detailed description and the accompanying figures.

BRIEF DESCRIPTION OF THE DRAWINGS

The figures presented herein are shown for illustrative purposes only, and may not be to scale.

DETAILED DESCRIPTION

Figure 1:
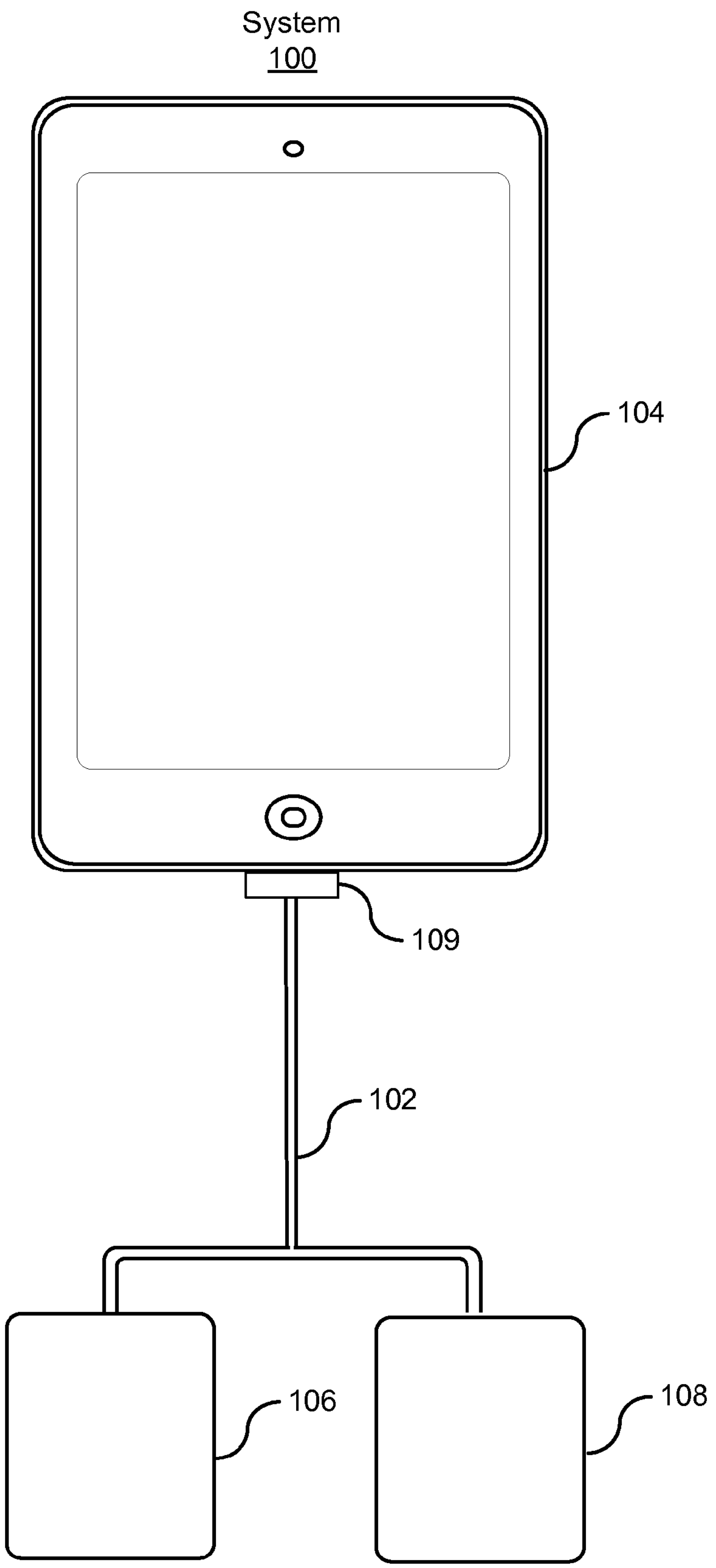
FIG. 1 illustrates a system for engaging a connector to a portable electronic device according to one embodiment of the present invention.

Some embodiments of the present invention provide for an electrical connector that can be used to facilitate various security-related and other functionalities. In some embodiments, for example, a connector can include a security locking mechanism for engaging or locking the connector to a portable electronic device. The connector can additionally support the transmission of security signals, data signals, power, and/or the like, to the portable electronic device. Electrical connectors according to embodiments of the present invention can include a variety of shapes, sizes, configurations, number of contacts, etc. For example, electrical connectors can include 6, 8 or 30 contacts.

According to some embodiments, a separate unlocking tool can be used to disengage the connector from the portable electronic device. More specifically, the unlocking tool can be applied to a connector and cause the locking mechanism of the connector to release such that the connector can be freely disconnected from the portable electronic device.

In one exemplary embodiment, a connector can be a male plug connector, such as a connector suitable for interfacing with an iPad®, iPod®, or iPhone® manufactured by Apple Inc. In the embodiment, the male plug connector can be situated at an end of a computer cable. The male plug connector can include hooks that can be used to engage with a portable electronic device's female receptacle connector such that the male plug connector and portable electronic device can be sufficiently locked with one another. In doing so, the portable electronic device can be tethered by the computer cable to a suitable fixture, etc. (e.g., a table, another computing device, a security system). The male plug connector can additionally include one or more pathways that can allow access to the lower portions of the connector's hooks. An unlocking tool can be used to access the pathways and cause the male plug connector's hooks to be shifted such that the hooks disengage from the portable electronic device's female receptacle connector.

The male plug connector can additionally be configured to facilitate various other functionalities, such as the transmission of security signals, the transmission of power, and/or the like. For instance, the male plug connector can be configured to facilitate the transmission of a security signal from a connected portable electronic device to a security system. The security system can periodically or continuously monitor for the presence of the security signal. If the security signal is not detected, the security system can generate an alert (e.g., an audio alert, an electronic alert, etc.). In some instances, the male plug connector can further be configured to facilitate the transmission of power to the portable electronic device from an external power source.

As discussed, embodiments can provide for security support (e.g., locking mechanisms, security signal transmission) in male plug connectors. In doing so, embodiments can enable portable electronic devices to be sufficiently secured such that theft of the portable electronic devices can be deterred. Embodiments can additionally enable for improved user experiences within retail environments. More specifically, by integrating security support with other functionalities (e.g., power transmission) into a single connector, embodiments can allow the number of required connectors and cables needed in a retail display to be reduced. As a result, the aesthetics of the retail display can be improved, device weight can be reduced, movement restrictions can be eliminated, and/or the like. For example, embodiments can enable a retail display to appear more aesthetically-pleasing and/or minimalistic. As another example, embodiments, by eliminating the added weight associated with a separate security cable, can allow a customer to better simulate normal use conditions.

FIG. 1 illustrates a system 100 for securing a connector to a portable electronic device according to one embodiment of the present invention. As shown in FIG. 1, system 100 can include a cable 102, a portable electronic device 104, a security system 106, and a power source 108. As further shown in FIG. 1 portable electronic device 104 and security system 106 can maintain a connection via cable 102. As additionally shown in FIG. 1, portable electronic device 104 can additionally be connected to power source 108 via cable 102.

Cable 102 can be any suitable cable capable of connecting with portable electronic device 104. Cable 102 can be or include, for example, a computer cable, a USB cable, a Firewire cable, a proprietary cable, a derivative cable (e.g., cable based on USB and/or Firewire), a ribbon cable, a flex cable, a wire, a bundle of wires and/or the like.

In some embodiments, cable 102 can include a male plug connector 109 for interfacing with a female receptacle connector of portable electronic device 104. Male plug connector 109 can be, for example, a 30-pin connector. Other connector types, however, can be used. In certain embodiments, the male plug connector can include a locking mechanism e.g., hooks for engaging with a female receptacle connector. More specifically, when male plug connector 109 is mated with a female receptacle connector (not shown) embedded within portable electronic device 104, the locking mechanism of male plug connector 109 can engage with the female receptacle connector such that cable 102 can be sufficiently locked to portable electronic device 104. For example, male plug connector 109 can include two hooks situated on each side of the male plug connector. The hooks can each be at least partially received by an inner cavity of the female receptacle connector. Thereafter, when a user attempts to disconnect the male plug connector 109 from the female receptacle connector, the hooks of the male plug connector can contact the bases of the inner cavities. As a result, a retention force can be generated that prevents male plug connector 109 from being disconnected from the female receptacle connector.

In certain embodiments, cable 102 can additionally include a number of connectors situated at an end opposite to the end at which male plug connector 109 is situated. According to some embodiments, the connectors can include a connector for interfacing with a security system, a connector for interfacing with a power source, a connector for interfacing with a computing device (e.g., a desktop computer), and/or the like. Illustratively, cable 102 can include a connector for interfacing with security system 106 and a USB connector for interfacing with power source 108.

According to some embodiments, cable 102 can facilitate the transmission of a security signal from portable electronic device 104 to security system 106. Security system 106 can use the received signal to monitor its connection with portable electronic device 104. Illustratively, cable 102 can include a path (e.g., one or more electrical elements or lines) connecting the male plug connector with the connector for interfacing with security system 106. When cable 102 is connected to portable electronic device 104 and security system 106, an electrical circuit between potable device 104 and security system 106 can be formed. Security system 106 can monitor the circuit in order to determine its current connection status with portable electronic device 104. In some embodiments, cable 102 can additionally facilitate the transmission of power from power source 108 to portable electronic device 104.

Portable electronic device 104 can be any portable electronic device with a female receptacle connector suitable for connecting to a male plug connector. Portable electronic device 104 can be, for example, a laptop computer, a tablet device, a key fob, a car key, an access card, a multi-function device, a mobile phone, a portable gaming device, a portable multimedia player, a portable music player, a personal digital assistant (PDA), a household appliance device, and/or any portable or non-portable electronic or electro-mechanical device and/or the like. Illustratively, portable electronic device 104 can be an iPad®, IPod®, or iPhone® device available from Apple Inc. of Cupertino, Calif.

Security system 106 can be any system suitable for securing a portable electronic device. Illustratively, security system 106 can be an alarm system that continuously or periodically monitors for a security signal from portable electronic device 104. In the event a security signal is not detected, security signal 106 can generate an alert or message. Illustratively, security system 106 can be connected to portable electronic device 104 via cable 102. While security system 106 is connected to portable electronic device 104, an electrical circuit can be maintained between the security system and portable electronic device. In the event the circuit is broken because e.g., cable 102 is severed or portable electronic device 104 is disconnected from cable 102, security system 106 can generate an audio alert.

Power source 108 can be any suitable source for providing power to portable electronic device 104. For example, power source 108 can be an AC adapter, a laptop computer, a desktop computer, a device with a USB port, and/or the like.

Figure 2:
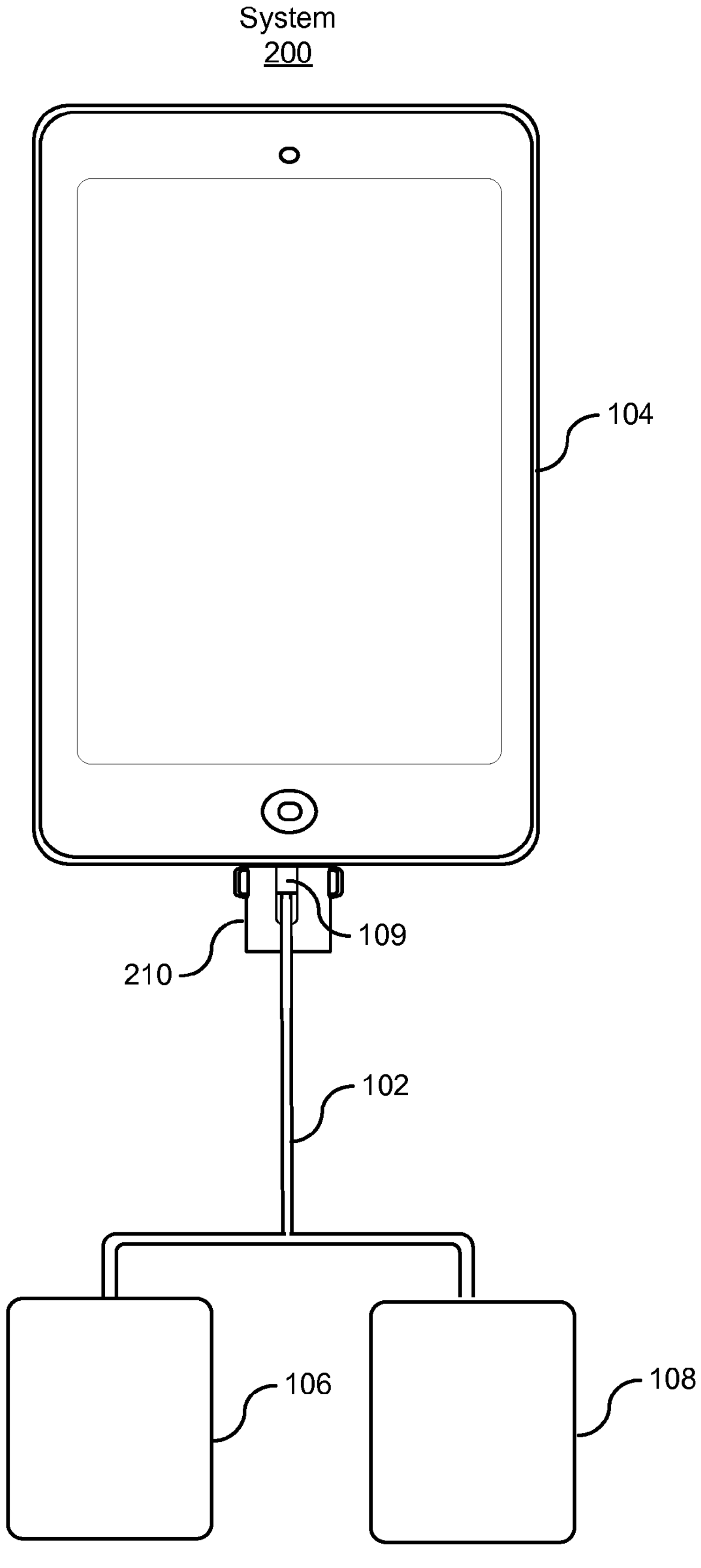
FIG. 2 illustrates a system for disengaging a connector from a portable electronic device according to one embodiment of the present invention.

FIG. 2 illustrates a system 200 for disengaging a male plug connector from a female receptacle connector according to one embodiment of the present invention. As shown in FIG. 2, system 200 includes a cable 102, a portable electronic device 104, a security system 106, a power source 108 and an unlocking tool 210. System 200 can be similar to system 100 shown in FIG. 1, except that system 200 includes an unlocking tool 210 partially enclosing male plug connector 109 of cable 102. The cabling of cable 102 can be run through a front opening of unlocking tool 210 and connect to security system 106 and power source 108.

As in system 100 of FIG. 1, male plug connector 109 can be locked to the female receptacle connector of portable electronic device 104. In some embodiments, a user can apply pressure or a slight force to the sides of unlocking tool 210 such that the tool causes male plug connector 109 to disengage from the female receptacle connector. In particular, the tool can cause the hooks of male plug connector 109 to be moved outside of the inner cavities of the female receptacle connector. The manner in which unlocking tool 210 can be used to cause the male plug connector to disengage from the female receptacle connector will be described in greater detail below.

It will be appreciated that the devices and cables shown in FIGS. 1 and 2 are illustrative and that variations and modifications are possible. For example, although the systems of FIGS. 1 and 2 show one cable, one portable electronic device, one security system, one power source, and/or one unlocking tool, any suitable number of these entities (including zero) can be included. Different entities can also be included. Illustratively, portable electronic device 104 of FIG. 1 can be connected to a security system, power source, and a desktop computer via cable 102.

Figure 3:
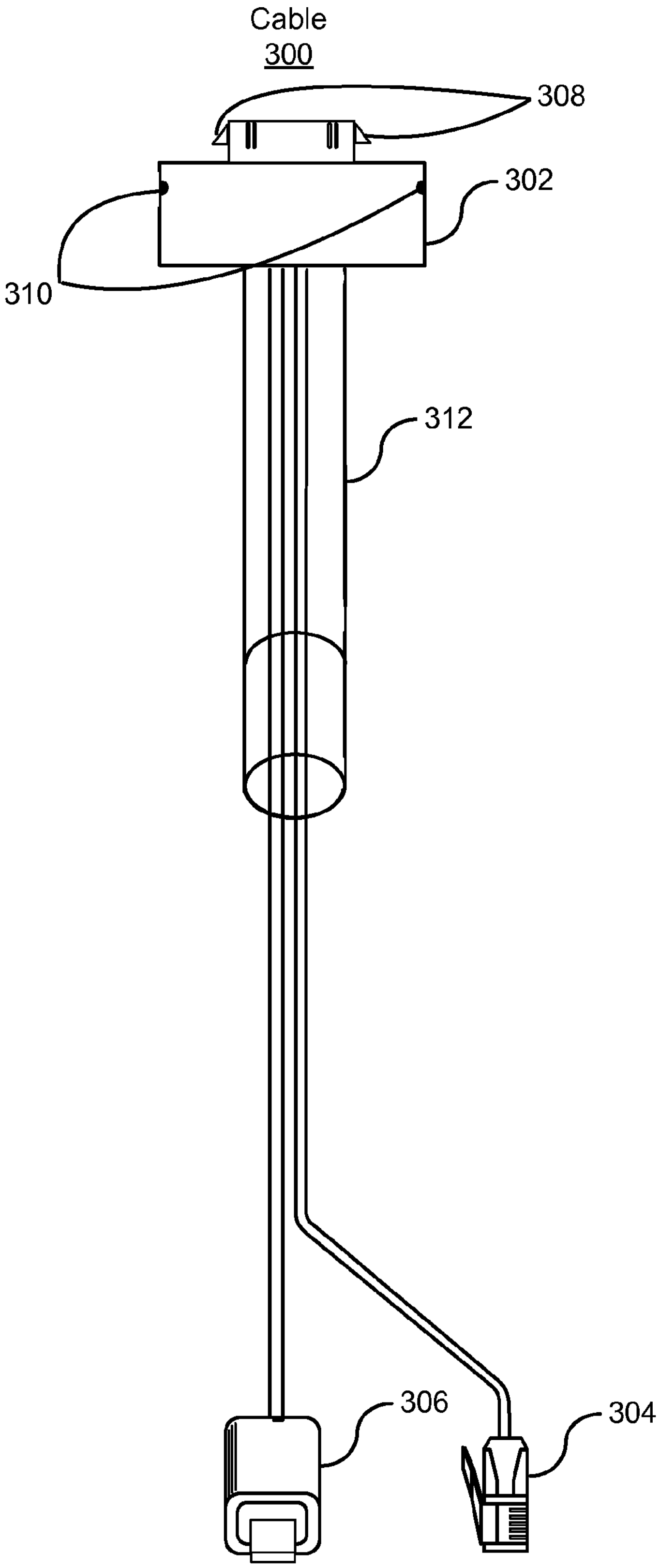
FIG. 3 illustrates an exemplary cable according to one embodiment of the present invention.

FIG. 3 illustrates an exemplary cable 300 (e.g., cable 102 of FIGS. 1 and 2) according to one embodiment of the present invention. Cable 300 can include a male plug connector 302, a security connector 304, a USB connector 306, and a cabling portion 312. Each of the aforementioned connectors can include a set of contacts or pins for supporting various functionalities.

Cabling portion 312 can include electrical elements or lines suitable for connecting one or more pins of a connector to one or more pins of another connector. For example, one or more electrical elements of cabling portion 312 can connect one or more pins of male plug connector 302 to one or more pins of security connector 304. As another example, one or more electrical elements of cabling portion 312 can connect one or more pins of male plug connector 302 to one or more pins of USB connector 306.

Male plug connector 302 can be any suitable connection mechanism for mating with a female receptacle of a portable electronic device. In some embodiments, for example, male plug connector 302 can be a 30-pin connector. In such embodiments, the 30-pin male plug connector can include 30 pin locations and 30 or fewer pins assigned to the pin locations. According to some embodiments and as shown in FIG. 3, male plug connector 302 can be situated at one end of cable 300.

In some embodiments, male plug connector 302 can include locking mechanism 308 for temporarily engaging or locking the male plug connector to a female receptacle connector of a portable electronic device. In doing so, cable 300 can be used to secure the portable electronic device. Specifically, cable 300 can tether the portable electronic device to, for example, another device, a security system, a power source, a table, other fixtures, and/or the like.

As further shown in FIG. 3, male plug connector 302 can include access pathways 310. Access pathways 310 can enable an unlocking tool to access locking mechanism 308. Upon accessing locking mechanism 308, the unlocking tool can cause the locking mechanism to release such that male plug connector 302 can become disengaged from a female receptacle connector.

In some embodiments, male plug connector 302 can include one or more pins or contacts for transmitting various signals. According to some embodiments, male plug connector 302 can include pins for transmitting a security signal. For example, the 30th pin of male plug connector 302 can be used to transmit a security signal to a security system. In some embodiments, male plug connector 302 can include additional circuitry to support transmission of the security signal. For example, male plug connector 302 can include circuitry capable of regulating, modifying, converting, and/or filtering the security signal such that the signal works properly with a connected security system. In some embodiments, male plug connector 302 can additionally include contacts or pins for receiving power and/or communicating data.

Security connector 304 can be any suitable connection for interfacing with a security system. Illustratively, security connector 304 can be an RJ-11 type connector suitable for interfacing with an RJ-11 socket of a security system. As shown in FIG. 3, security connector 304 can be situated at an end of cable 300 opposite to the end where male plug connector 302 is situated. In certain embodiments, security connector 304 can facilitate the transmission of a security signal from portable electronic device 104 to security system 106. For example, security connector 304 can be connected to a security system. One or more pins of security connector 304 can receive a security signal from a connected portable electronic device (via male plug connector 302 and cabling portion 312) and provide the security signal to the security system.

USB connector 306 can be a standard or derivative USB connector. Illustratively, USB connector 306 can be a conventional USB connector for interfacing with the USB port of another device, such as a desktop computer, a laptop, an A/C adaptor, and/or the like. As shown in FIG. 3, USB connector 306 can be situated at an end of cable 300 opposite to the end where male plug connector 302 is situated In certain embodiments, USB connector 306 can facilitate the transmission of power (via male plug connector 302 and cabling portion 312) to a portable electronic device from a USB port with which USB connector 306 is connected. Illustratively, USB connector 306 can include pins or contacts for drawing up to 5V from a connected USB port. The power that is drawn can be transmitted to a portable electronic device, which can use the power to operate circuitry located in the portable electronic device, charge a battery associated with the portable electronic device, etc.

In some embodiments, USB connector 306 can additionally facilitate data transmission (via male plug connector 302 and cabling portion 312) between a portable electronic device and the device to which USB connector 306 is connected. For example, USB connector 306 can include pins or contacts for receiving and transmitting data signals to a portable electronic device. The data signals can be, for example signals compliant with USB 1.0, USB 2.0, USB 3.0, or other USB standards that have been developed, are currently being developed, or will be developed in the future.

Although not explicitly shown in FIG. 3, cable 300 can include other connectors, such as connectors to receive data signals (e.g., Ethernet cables), video signals (e.g., HDMI, DVI, DisplayPort, RCA, coaxial connectors, and/or the like), audio signals (e.g., TS connectors, TRS connectors, RCA connectors, and/or the like), etc. For example, cable 300 can include an HDMI connector for receiving a video signal from a connected device and transmitting the signal to a portable electronic device.

Figure 4A:
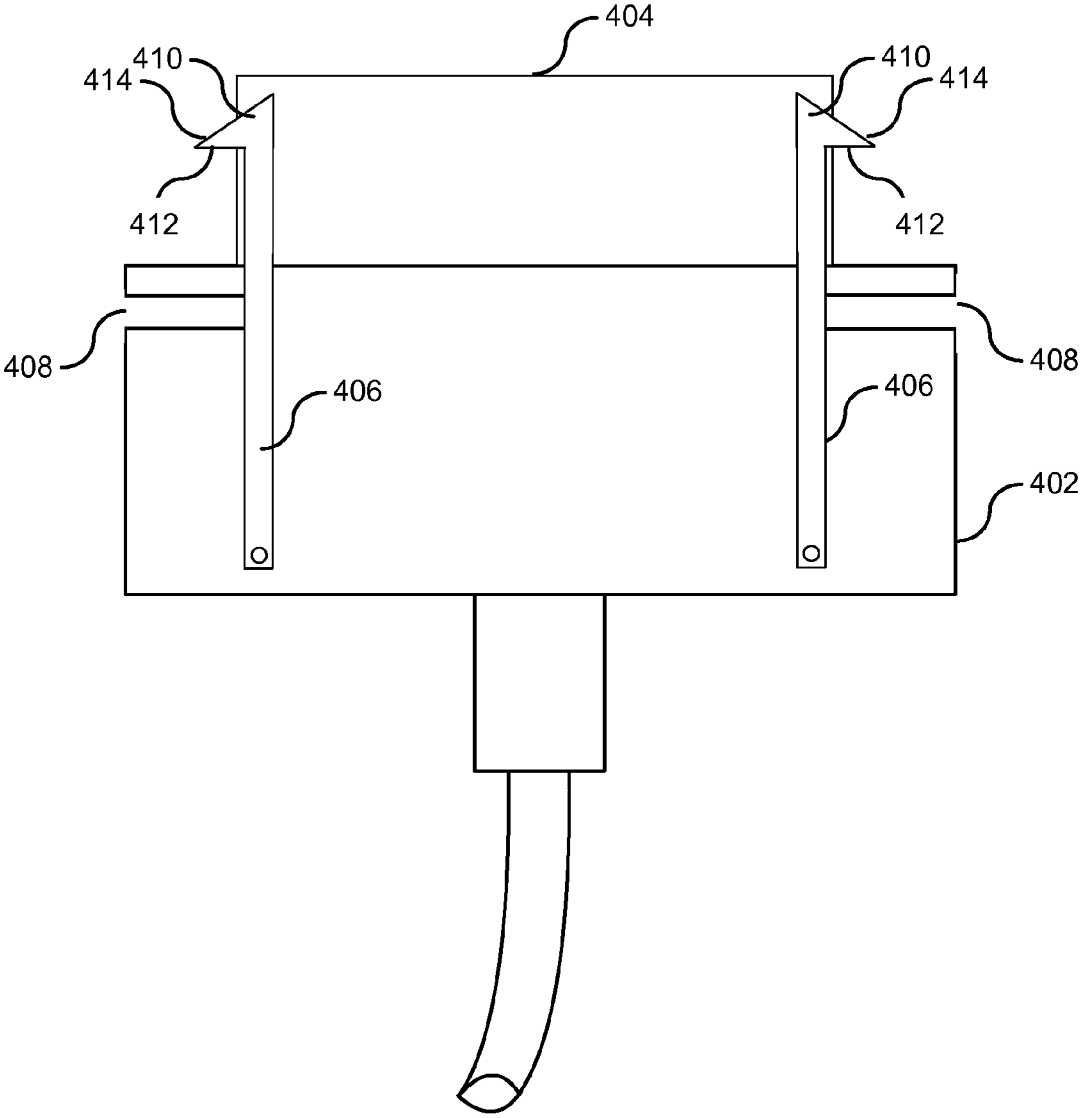
FIG. 4A illustrates a cross section view of an exemplary male plug connector according to one embodiment of the present invention.

FIGS. 4A-4D illustrate cross section, side, top, and angled views of an exemplary male plug connector 400 (e.g., male plug connector 302 of FIG. 3) according to one embodiment of the present invention. Referring to FIG. 4A, a cross section view of male plug connector 400 is illustrated. As shown in FIG. 4A, male plug connector 400 can include an plug body 402, a plug housing 404, hooks 406, and access pathways 408. Plug body 402 can be any suitable housing that allows a user to hold or grip male plug connector 400 such that the mating or interfacing of the male plug connector to a female receptacle connector of a portable electronic device can be facilitated. Plug body 402 can be composed of any suitable material or combinations of material, such as plastic, metal, wood, acrylic, glass, composite material, and/or the like. In some embodiments, plug body 402 can include an image, icon, label, or other element for identifying the male plug connector. Illustratively, plug body 402 can include a lock icon situated on its outer surface. The lock icon can enable a user to identify that male plug connector 400 includes security functionalities. In some embodiments, plug body 402 can at least partially enclose plug housing 404 and hooks 406. Plug body 402 can further include access pathways 408 that enable an external unlocking tool to access hooks 406. As will be discussed below, access pathways 408 can be passages within plug body 402 that lead to hooks 406.

Plug housing 404 can be any suitable connection mechanism for connecting with the female receptacle connector of a portable electronic device. Plug housing 404 can be composed of any suitable material or combinations of material, such as plastic, metal, wood, acrylic, glass, composite material, and/or the like. In some embodiments, plug housing 404 can be formed to fit the receptacle tongue of a female receptacle connector. For example, plug housing 404 can include an insert opening formed to accept a receptacle tongue. In certain embodiments, plug housing 404 can include one or more contacts or pins. When plug housing 404 is mated with a receptacle tongue, the plug housing's pins can be electrically coupled to the pins of the receptacle tongue. In doing so, various functionalities can be facilitated. Illustratively, power can be supplied to a portable electronic device. A security signal can additionally be transmitted from the portable electronic device to a connected security system.

In some embodiments, each pin can be located at a pin location within plug housing 404. The number of pins in plug housing 404 can be equal to or less than the total number of pin locations in the plug housing. Illustratively, plug housing 404 can include 30 pin locations with 30 pins assigned to each location. As another example, plug housing 404 can include 30 pin locations, but have only 6 pins. The pins within plug housing 404 can be assigned to any suitable pin location. The assigned locations of the pins can be, but need not be consecutive.

In some embodiments, plug housing 404 can include openings disposed on each of its sides. The openings can be configured to allow portions of hooks 406 (e.g., locking portions 410) to exit through the opening.

Hooks 406 can be any suitable mechanism for engaging male plug connector 400 with the female receptacle connector of a portable electronic device. Hooks 406 can be formed of a flexible metal or other material having a spring-like quality; can be biased by a spring; etc. such that the hooks can be deflected during the connection of male plug connector 400 to a female receptacle connector, and returned to their original positions following the connection of the male plug connector to the female receptacle connector. Illustratively, as male plug connector 400 is being mated with a female receptacle connector, hooks 406 can be shifted inward. Following the mating event, hooks 406 can be shifted back to their original positions. In shifting back to their original positions, hooks 406 can engage with the female receptacle connector as to lock the male plug connector to the female receptacle connector.

For example, according to some embodiments, hooks 406 can be configured to tilt inward during a mating event. In particular, each hook 406 can have its base fixed or attached within plug body 402 and/or plug housing 404. Each hook 406 can be further configured to pivot around its base such that the hook can be tilted inward during a mating event. As a result of the tilting, each hook's 406 locking portion 410 (described in greater detail below) can retreat into plug housing 404. Following mating, each hook 406 can tilt back to its original position such that its locking portion 410 extends back outside of plug housing 404, thereby locking the male plug connector with a female receptacle connector.

As another example, according to certain embodiments, hooks 406 can be configured to bend inward during a mating event. In particular, each hook 406 can have its base fixed or attached within plug body 402 and/or plug housing 404. Illustratively, the base of each hook 406 can be anchored by, for instance, a channel within plug body 402. The upper portion of each hook 406 can be configured to bend inward during a mating event. As a result of the bending, each hook's 406 locking portion 410 can retreat into plug housing 404. Following mating, the upper portion of each hook 406 can bend back to its original position such that each hook's 406 locking portion 410 extends back outside of plug housing 404, thereby locking the male plug connector with a female receptacle connector.

As still another example, according to some embodiments, hooks 406 can be configured to move inward during a mating event. In such embodiments, the base of each hook is not fixed to a particular position within plug body 402 and/or plug housing 404. Rather, during a mating event, the entirety of each hook can be moved inward. As a result of the movement, each hook's 406 locking portion 410 can retreat into plug housing 404. Following mating, each hook 406 can be moved back to its original position such that its locking portion 410 extends back outside of plug housing 404, thereby locking the male plug connector with a female receptacle connector. In such embodiments, hooks 406 can remain vertical (or substantially vertical) and remain unbent during mating.

As shown in FIG. 4A and briefly discussed, hooks 406 can include locking portions 410 that enable each hook 406 to engage a female receptacle connector. Each locking portion 410 or "barb" can protrude through an opening on a side of plug housing 404. As discussed, an individual hook 406 can be moved, tilted, or bent during a mating event such that its associated locking portion 410 can retreat within the opening. Each locking portion 410 can be structured and shaped in a suitable manner in order to engage with a female receptacle connector. For example, an individual locking portion can have a triangular shape. The shape can approximate, for instance, a right-angled triangle. In some embodiments, side 414 of an individual locking portion 410 can be sloped relative to a female receptacle connector such that an individual hook 406 can be engaged or locked to the female receptacle connector with a relatively small amount of force. In particular, a relatively small amount of force can be required to cause individual hook 406 to enter an inner cavity of the female receptacle connector. Side 412 of the individual locking portion 410 can be parallel or substantially parallel to the inner cavity of the connected female receptacle connector. As a result, side 412 can act as a retention mechanism that locks male plug connector 400 to the female receptacle connector. In some embodiments, the force required to disconnect male plug connector 400 from the female receptacle connector can be larger than the force needed to connect the male plug connector to the female receptacle connector. In certain embodiments, the force required to disconnect male plug connector 400 from female receptacle connector can be sufficiently large as to break hooks 406 when the hooks are engaged to the female receptacle connector.

As discussed, side 412 can be parallel or substantially parallel to the base of an inner cavity of a female receptacle connector. In certain embodiments, side 412 can be ±5 degrees to the base of an inner cavity of a female receptacle connector. In other embodiments, side 412 can be ±15 degrees to the base of an inner cavity of a female receptacle connector. In some embodiments, side 412 can be a length between 1.05 and 1.30 mm. For example, side 412 can be 1.13 mm in length.

Access pathways 408 can include access paths configured to receive at least a portion of an external unlocking tool. For example, male plug connector 400 can include two access pathways. As shown in FIG. 4A, the two access pathways can be situated on opposite sides of the male plug connector. In some embodiments, the access paths of access pathways 408 can enable the unlocking tool to access hooks 406 and cause the hooks to disengage from a female receptacle connector. More specifically, pins of an external unlocking tool can travel along the length of the access paths and contact release points of hooks 406 such that the hooks are moved, tilted, or bent inward. In doing so, the hooks 406 can become disengaged from the female receptacle connector such that a portable electronic device can be easily disconnected from the female receptacle connector. Access pathways 408 can be any suitable shape and include any suitable dimensions for receiving an external unlocking tool. For example, each access pathway 408 can be cylindrical in shape. Each access pathway 408 can additionally include a diameter such that a special tool is required to access the pathway. In some embodiments, the diameter of each access pathway 408 can be smaller than certain standard and/or conventionally available items. For example, an individual access pathway 408 can include a diameter smaller than a standard paper clip. As such, a standard paper clip would be too thick to be used to enter access pathway and access a hook 406. As a result, unlocking a male plug connector from a female receptacle connector can be made difficult. In some embodiments, access path 408 can have a diameter that is 0.808 mm or less.

Figure 4B:
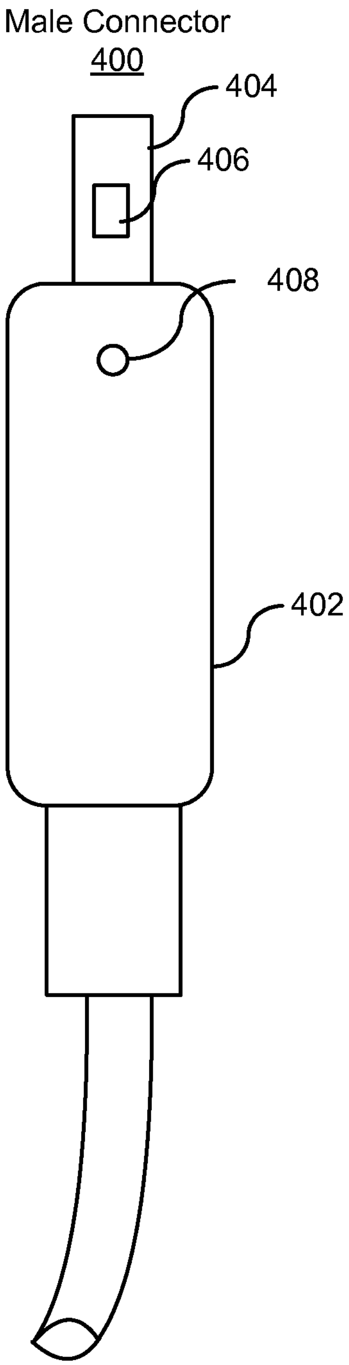
FIG. 4B illustrates a side view of the exemplary male plug connector shown in FIG. 4A.
Figure 4C:
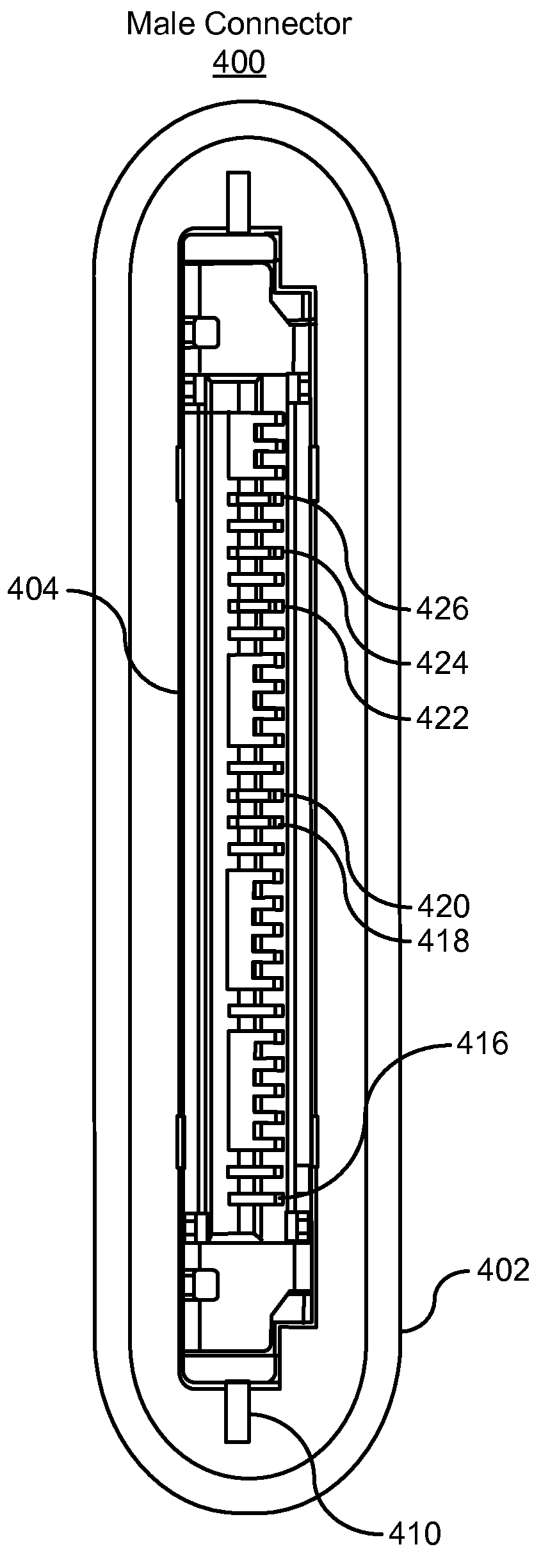
FIG. 4C illustrates a top view of the exemplary male plug connector shown in FIG. 4A.
Figure 4D:
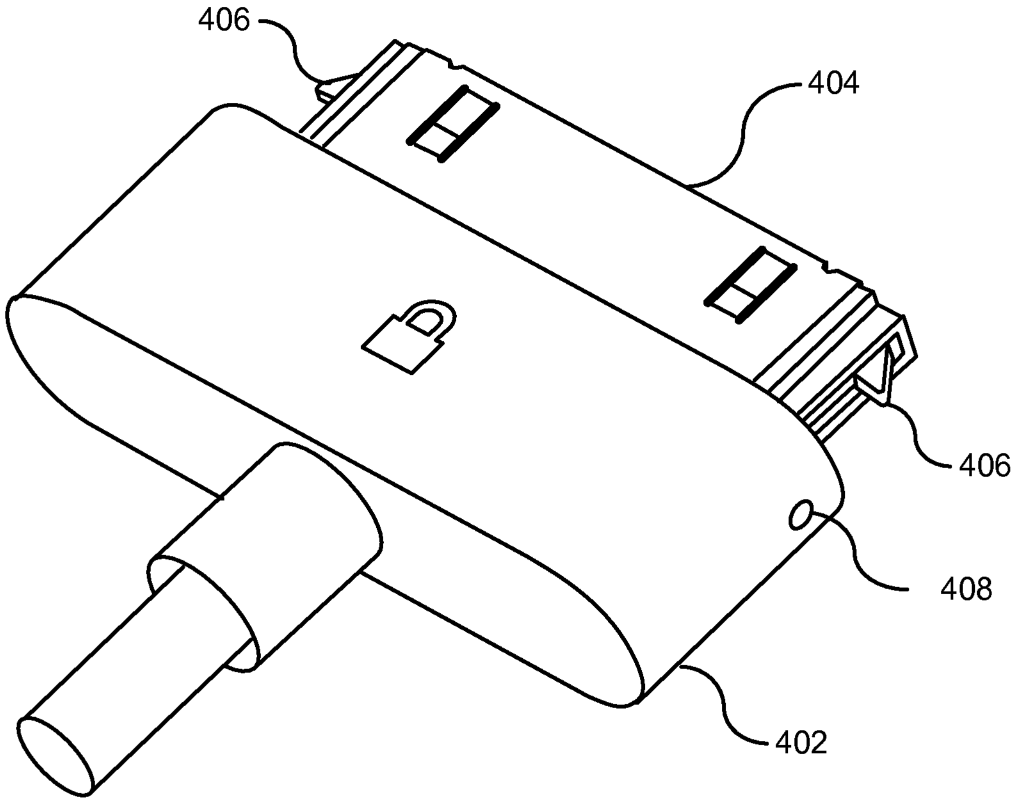
FIG. 4D illustrates an angled view of the exemplary male plug connector shown in FIG. 4A.

FIG. 4B illustrates a side view of male plug connector 400. In particular, FIG. 4B shows plug body 402, plug housing 404, an individual hook 406, and an individual access pathway 408. As discussed, an external unlocking tool can access pathway 408 and cause hook 406 to become disengaged from a connected female receptacle connector. FIG. 4C illustrates a top view of male plug connector 400. In particular, FIG. 4C shows the various pins that can be included in plug housing 404. In some embodiments, pin 422 can be used transmit power (e.g., USB 5V power). Pins 424 and 426 can additionally be used to transmit data (e.g., USB D+/−). Pins 418 and 420 can be used to provide ground function (e.g., USB ground). In certain embodiments, pin 416 can be used to transmit a security signal. Other pins can be used, however, to additionally or alternatively transmit a security signal. FIG. 4D illustrates an angled view of male plug connector 400. In particular, FIG. 4D shows plug body 402, plug housing 404, hooks 406, and an individual access pathway 408.

Figure 5:
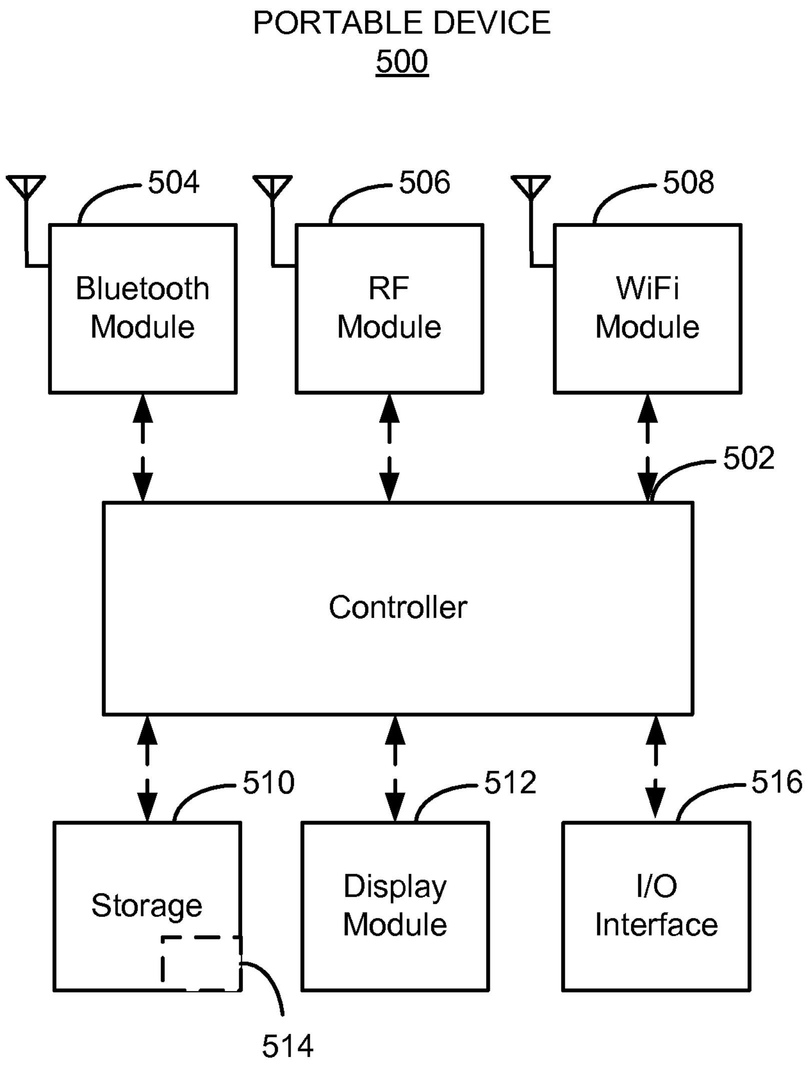
FIG. 5 illustrates the components of an exemplary portable electronic device according to one embodiment of the present invention.

FIG. 5 is a block diagram showing the components of an exemplary portable electronic device 500 (e.g., portable electronic device 104 of FIGS. 1 and 2) according to one embodiment of the present invention. In one example, portable electronic device 500 can include a controller 502, a Bluetooth module 504, an RF module 506, a WiFi module 508, a storage module 510, a display module 512, and an accessory input/output module 516. In some embodiments, portable electronic device 500 can include additional modules, such as global positioning system (GPS) modules, battery modules, motion detection modules, device orientation modules, audio modules, three-dimensional video processing modules, magnometer modules, three-dimensional gyroscope modules, acceleration detection modules, and/or the like. In some embodiments, portable electronic device 500 can be a sufficient size, dimension, and weight to enable the device to be easily moved by a user. For example, portable electronic device 500 can be pocket size.

Controller 502, which can be implemented as one or more integrated circuits, can control and manage the overall operation of portable electronic device 500. For example, controller 502 can perform various tasks, such as retrieving various assets that can be stored in storage module 510, accessing the functionalities of various modules (e.g., interacting with other Bluetooth enabled devices via Bluetooth module 504), executing various software programs (e.g., operating systems and applications) residing on storage module 510, transmitting wireless network access credentials, transmitting device identifiers, and so on. In some embodiments, controller 502 can include one or more processors (e.g., microprocessors or microcontrollers) configured to execute machine-readable instructions. For example, controller 502 can include a single chip applications processor. Controller 502 can further be connected to storage module 510 in any suitable manner.

Bluetooth module 504 can include any suitable combinations of hardware for performing wireless communications with other Bluetooth enabled devices and allows an RF signal to be exchanged between controller 502 and other Bluetooth enabled devices. In some embodiments, Bluetooth module 504 can perform such wireless communications according to standard Bluetooth Basic Rate/Enhanced Data Rate (BR/EDR) and/or Bluetooth Low Energy (LE) standards. For example, Bluetooth module 504 can include suitable hardware for performing device discovery, connection establishment, and communication based on only Bluetooth LE (e.g., single mode operation). As another example, Bluetooth module 504 can include suitable hardware for device discovery, connection establishment, and communication based on both standard Bluetooth BR/EDR and Bluetooth LE (e.g., dual mode operation). As still another example, Bluetooth module 504 can include suitable hardware for device discovery, connection establishment, and communication based only on standard Bluetooth BR/EDR.

RF module 506 can include any suitable combinations of hardware for performing wireless communications with wireless voice and/or data networks. For example, RF module 506 can include a RF transceiver (e.g., using mobile telephone technology such as GSM or CDMA, advanced data network technology such as 5G or EDGE) that enables a user of portable electronic device 500 to place telephone calls over a wireless voice network.

WiFi module 508 can include any suitable combinations of hardware for performing WiFi (e.g., IEEE 802.11 family standards) based communications with other WiFi enabled devices.

Storage module 510 can be implemented, e.g., using disk, flash memory, random access memory (RAM), hybrid types of memory, optical disc drives or any other storage medium that can store program code and/or data. Storage module 510 can store software programs 514 that are executable by controller 502, including operating systems, applications, and related program code.

Software programs 514 (also referred to as software or apps herein) can include any program executable by controller 502. In some embodiments, certain software programs can be installed on portable electronic device 500 by its manufacturer, while other software programs can be installed by a user. Examples of software programs 514 can include operating systems, productivity applications, video game applications, personal information management applications, applications for playing media assets and/or navigating a media asset database, applications for controlling a telephone interface to place and/or receive calls, and so on. Certain software programs 514 can provide communication with and/or control of portable electronic devices, and certain software programs 514 can be responsive to control signals or other input from portable electronic device 500.

Display module 512 can be implemented as a CRT display, an LCD display (e.g., touch screen), a plasma display, a direct-projection or rear-projection DLP, a microdisplay, and/or the like. In various embodiments, display module 512 can be used to visually display user interfaces, images, and/or the like. In some embodiments, display module 512 can also be configured to receive input from a user of portable electronic device 500. For example, display module 512 can be an LCD-based touch screen. During operation, display module 512 can present graphical user interfaces to a user and also receive inputs (e.g., finger taps) from the user.

Input/output (I/O) interface 516 can include a number of signal paths configured to carry various signals between portable electronic device 500 and a connected device or system. In one embodiment, accessory I/O interface 516 can include a 30-pin female receptacle connector corresponding to the connector used on iPad®, iPod® and iPhone° products manufactured and sold by Apple Inc.; other connectors can also be used. In some embodiments, input/output interface 516 can receive power from a connected device (e.g., an AC adapter, a laptop computer, etc.), transmit security signals, transmit data signals, etc.

Figure 6A:
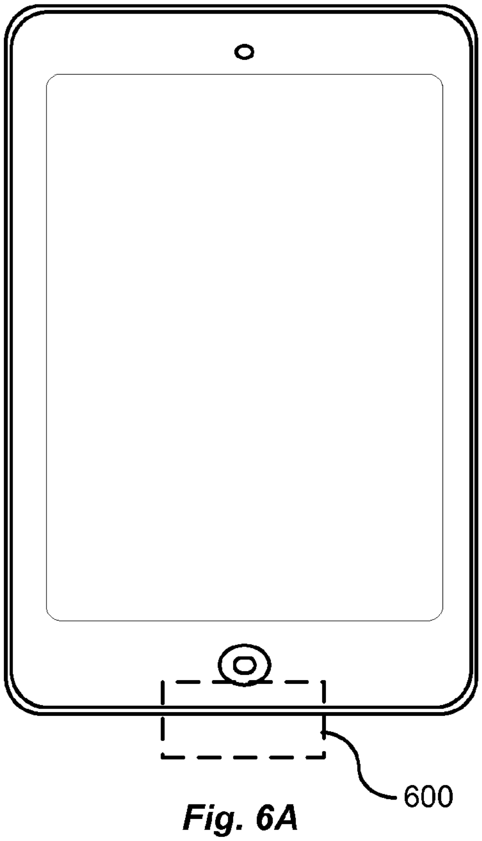
FIG. 6A illustrates the location of a female receptacle connector within an exemplary portable electronic device according to one embodiment of the present invention.
Figure 6B:
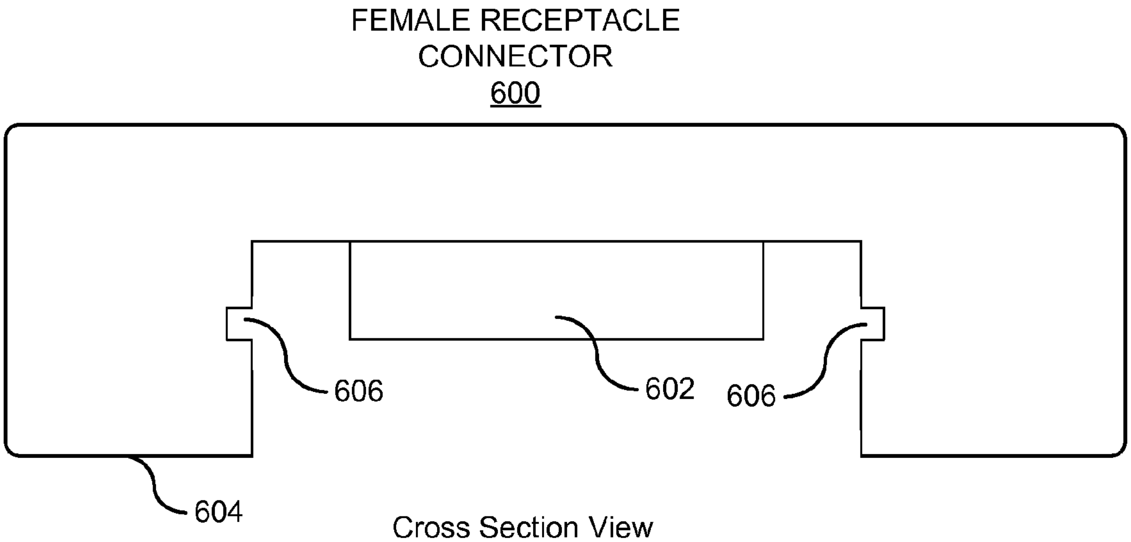
FIG. 6B illustrates a cross section view of an exemplary female receptacle connector according to one embodiment of the present invention.

FIGS. 6A-6B illustrate an exemplary female receptacle connector 600 of a portable electronic device according to one embodiment of the present invention. Referring to FIG. 6A, an example location for female receptacle connector 600 within a portable electronic device (e.g., portable electronic device 104 of FIGS. 1 and 2) is illustrated. As shown in FIG. 6A, female receptacle connector 600 can be located at the base of a portable electronic device.

Referring to FIG. 6B, a cross section view of female receptacle connector 600 is illustrated. As shown in FIG. 6B, female receptacle connector 600 can include a receptacle tongue 602 and a housing portion 604. Receptacle tongue 602 can be an injection molded around one or more contacts. In some embodiments, receptacle tongue 602 can provide mechanical support for the contacts. Receptacle tongue 602 can additionally provide a moisture or water-resistant seal around the contacts, thereby helping to protect components or circuits in the interior of the portable electronic device. In some embodiments, receptacle tongue 602 can be formed to fit within the plug housing of a male plug connector.

Housing portion 604 can be formed using any suitable material or combination of materials, such as plastic, metal, wood, acrylic, glass, composite material, and/or the like. In some embodiments, housing portion 604 can enclose receptacle tongue 602 and form a recess with which a male plug connector can fit. For example, housing portion 604 can include dimensions such that a plug housing of a male plug connector can be fit within the recess and interface with receptacle tongue 602. In some embodiments, housing portion 604 can include inner cavities 606. While the female receptacle connector is being connected to a male plug connector, inner cavities 606 can, in some embodiments, receive the locking portions of the hooks of the male plug connector. Following the connection of the female receptacle connector and male plug connector, the locking portions can be situated within inner cavities 606. Through receiving the locking portions in this manner, female receptacle connector 600 can be locked to the male plug connector.

In some embodiments, housing portion 604 can additionally be used, at least in part, to enclose other components and/or circuitry of a portable electronic device. For example, housing portion 604 can additionally enclose a portable electronic device's applications processor, Bluetooth modules, WiFi modules, and/or the like.

Figure 7A:
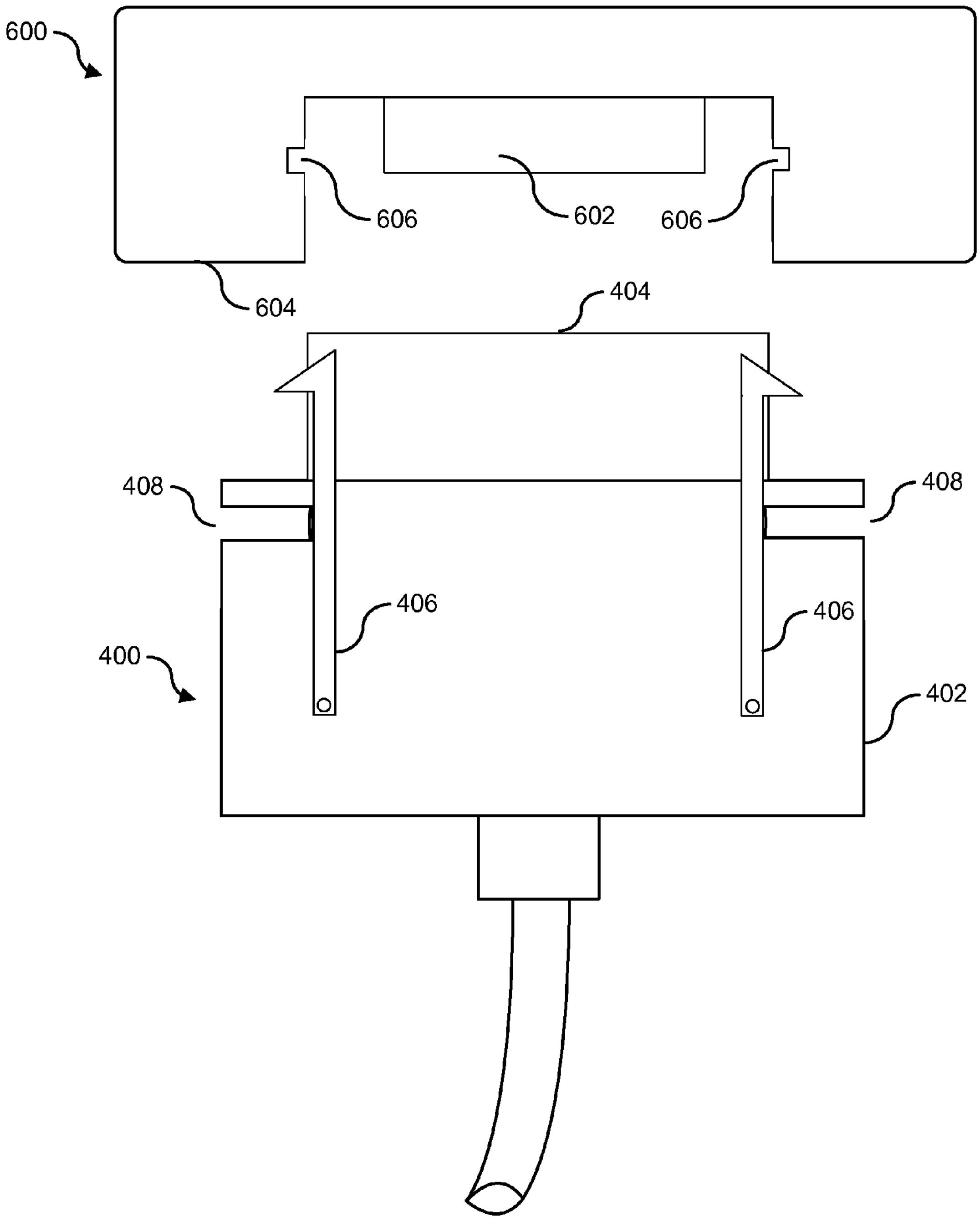
FIGS. 7A-7C illustrate the engagement of a male plug connector to a female receptacle connector according to one embodiment of the present invention.
Figure 7B:
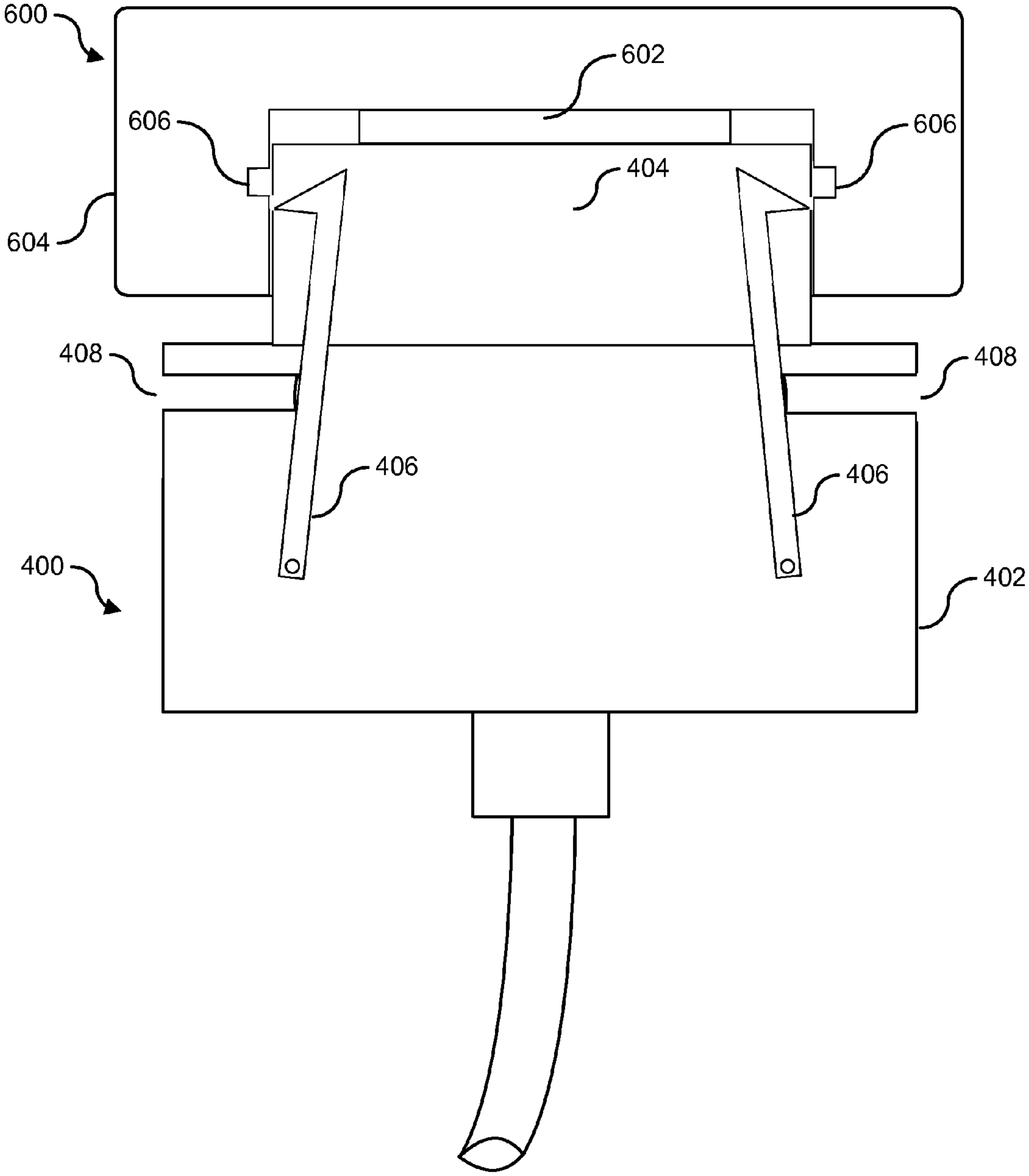
Figure 7C:
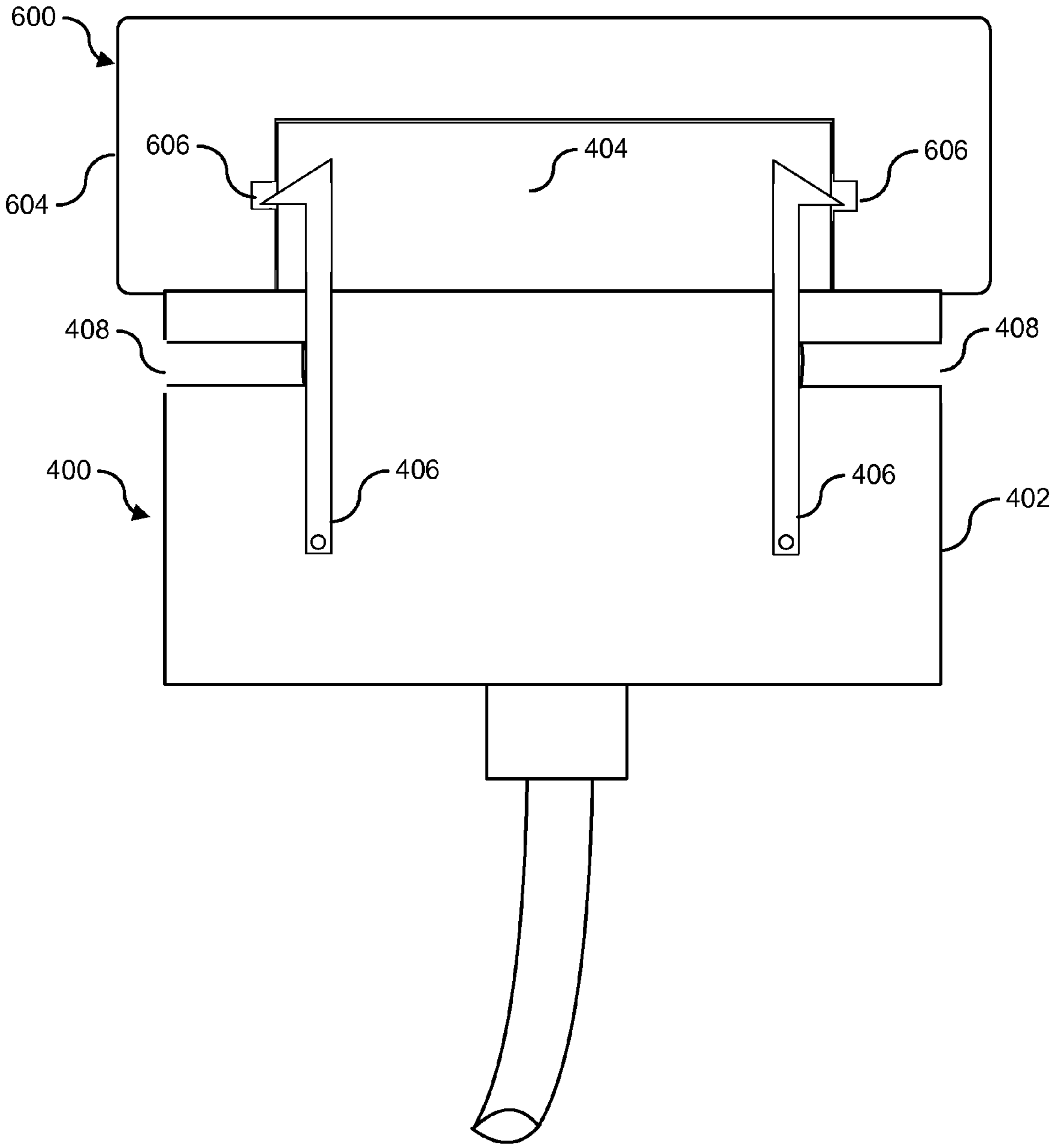

FIGS. 7A-7C illustrate the engagement of a male plug connector (e.g., male plug connector 400) to a female receptacle connector (e.g., female plug connector 600) according to one embodiment of the present invention.

FIG. 7A illustrates a cross section view of male plug connector 400 and female receptacle connector 600 prior to their connection. FIG. 7B illustrates a cross section view of male plug connector 400 and female receptacle connector 600 as the connectors are being connected. As shown in FIG. 7B, each hook of male plug connector 400 can be tilted inward by the walls of female receptacle connector 600. Each hook, however, can maintain an outward force such that each hook moves along and touches the surface of a wall of female receptacle connector 600. FIG. 7C illustrates a cross section view of male plug connector 400 and female receptacle connector 600 after the connectors have been fully connected. As shown in FIG. 7C, due to the outward force of the hooks of male plug connector 400, the hooks can be tilted back to their original positions. As a result, the locking portions of the hooks can enter the inner cavities of female receptacle 600. In doing so, male plug connector 400 can be sufficiently locked in place with female receptacle connector 600.

Figure 8A:
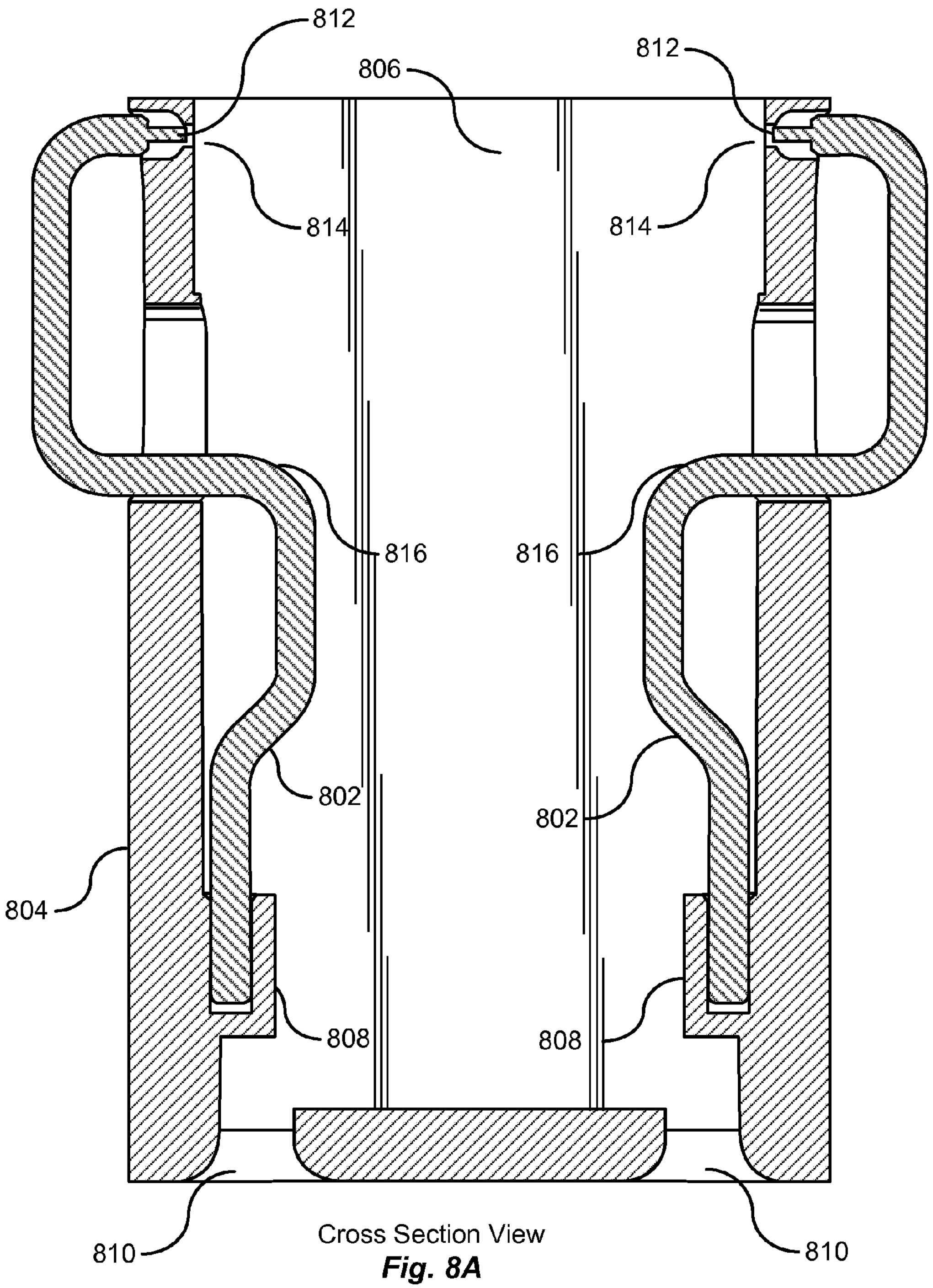
FIG. 8A illustrates a cross section view of an exemplary unlocking tool according to one embodiment of the present invention.

FIGS. 8A-8E illustrate various views of an exemplary unlocking tool 800 (e.g., unlocking tool 208) according to one embodiment of the present invention. FIG. 8A illustrates a cross section view of unlocking tool 800. Unlocking tool 800 can be any device suitable for disengaging a male plug connector from the female receptacle connector of a portable electronic device. As shown in FIG. 8A, unlocking tool 800 can include user initiation portions 802 and a housing 804.

User initiation portions 802 can be a set of (e.g., two) wire form modules that can be used to disengage the hooks of a male plug connector from a female receptacle connector. User initiation portions 802 can be implemented using any suitable material or combination of materials, such as plastic, metal, wood, acrylic, glass, composite material, and/or the like. For example, user initiation portions 802 can be implemented using a suitable metal or composite material with sufficient flexibility such that the initiation portions can be bent in response to the application of a slight force by, for instance, the hand of a user. Following the application of force, the user initiation portions 802 can return to their original positions.

In some embodiments, each user initiation portions 802 can include a pin 812. As shown in FIG. 8A, pin 812 can be situated at an end of an individual user initiation portion 802. Each pin 812 can be a segment of an individual user initiation portion 802 that has a reduced or a smaller diameter relative to other parts of the user initiation portion. According to some embodiments, pins 812 can each include a diameter of 0.8 mm or less. In some embodiments, an individual pin 812 can, in response to user application of unlocking tool 800, access a pathway of a male plug connector and cause a hook of the male plug connector to disengage from a female receptacle connector. Illustratively, a user can apply pressure to portions of user initiation portions 802 (e.g., the portions extending out of cavity 806, which is described below). Such pressure can cause pins 812 to be moved into the access pathways of a male plug connector, and contact the male plug connector's hooks. The force of the contact can cause the hooks to be moved, titled, or bent inward such that the hooks can be disengaged from a female receptacle connector. Upon disengagement of the hooks, a user can freely remove the male plug connector from the female receptacle connector. In some embodiments, pins 812 can be of sufficient lengths to enable the pins to pass through the pathways of a male plug connector and disengage the hooks of the male plug connector.

In certain embodiments, a portion of each user initiation portion 802 can extend horizontally (e.g., portions 816) within a cavity (e.g., cavity 806, which is described below) of housing 804. In doing so, the portions can together act to restrict or stop the movement of a male plug connector into the lower portion of the cavity. In doing so, the male plug connector can be vertically aligned with unlocking tool 800. For example, portions 816 can vertically align pins 812 of the user initiation portions with the access pathways of the male plug connector.

Housing 804 can be implemented using any suitable material or combination of materials, such as plastic, metal, wood, acrylic, glass, composite material, and/or the like. In some embodiments, for example, housing 804 can be an injection molded plastic housing. According to certain embodiments, housing 804 can be a non-descript color, such as black, white, or various shades of gray. In some embodiments, housing 804 can be generally rectangular. More specifically, the outer and inner surfaces can be substantially rectangular or include mostly straight surfaces. In some embodiments, housing 804 can include surfaces that are slightly curved or rounded.

As shown in FIG. 8A, housing 804 can form a cavity 806. Cavity 806 can include dimensions that enable the cavity to receive a male plug connector. In certain embodiments, a male plug connector can be received into cavity 806 through a top opening of housing 804. In some embodiments, the male plug connector can be positioned within cavity 806 such that the access pathways of the male plug connector can be horizontally aligned with pins 812. By horizontally aligning pins 812 with the pathways, embodiments can enable the pins to be used to disengage a male plug connector from a female receptacle connector.

In some embodiments, housing 804 can include bottom openings 810. According to certain embodiments, bottom openings 810 can be used to receive, for example, a lanyard, a chain, or some other mechanism for enabling a user to carry unlocking tool 800 on his or her person. For example, one end of a lanyard can be threaded into a first opening of the bottom openings. The same end can further be threaded out a second opening of the bottom openings. In doing so, the lanyard can be sufficiently attached to housing 804 such that unlocking tool 800 can be carried by a user. Illustratively, a user can wear, around his or her neck, the lanyard in order to conveniently carry unlocking tool 800.

In some embodiments, housing 804 can include pin openings 814 for receiving pins 812 of user initiation portions 802. The pin openings can have dimensions such that only pins 812 of user initiation portions 802 can pass through the openings. In particular, once the pins 812 have passed entirely through the openings, walls surrounding openings 814 can restrict or stop the inward movement of user initiation portions 802. In doing so, housing 804 can enable user initiation portions 802 to be moved sufficiently inward as to disengage the hooks of a male plug connector while preventing the user initiation portion from being moved so far as to cause damage to the hooks or otherwise interfere with the operations of the male plug connector.

In some embodiments, housing 804 can include a set of channels 808, which can receive user initiation portions 802. In some embodiments, the channels can be filled with an adhesive material, such as glue or epoxy. In doing so, user initiation portions 802 can be mated to housing 804.

Figure 8B:
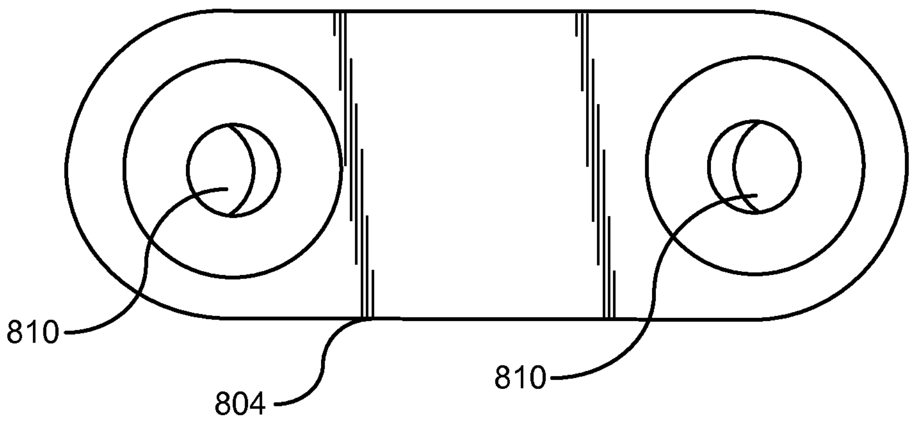
FIG. 8B illustrates a bottom view of the exemplary unlocking tool shown in FIG. 8A.
Figure 8C:
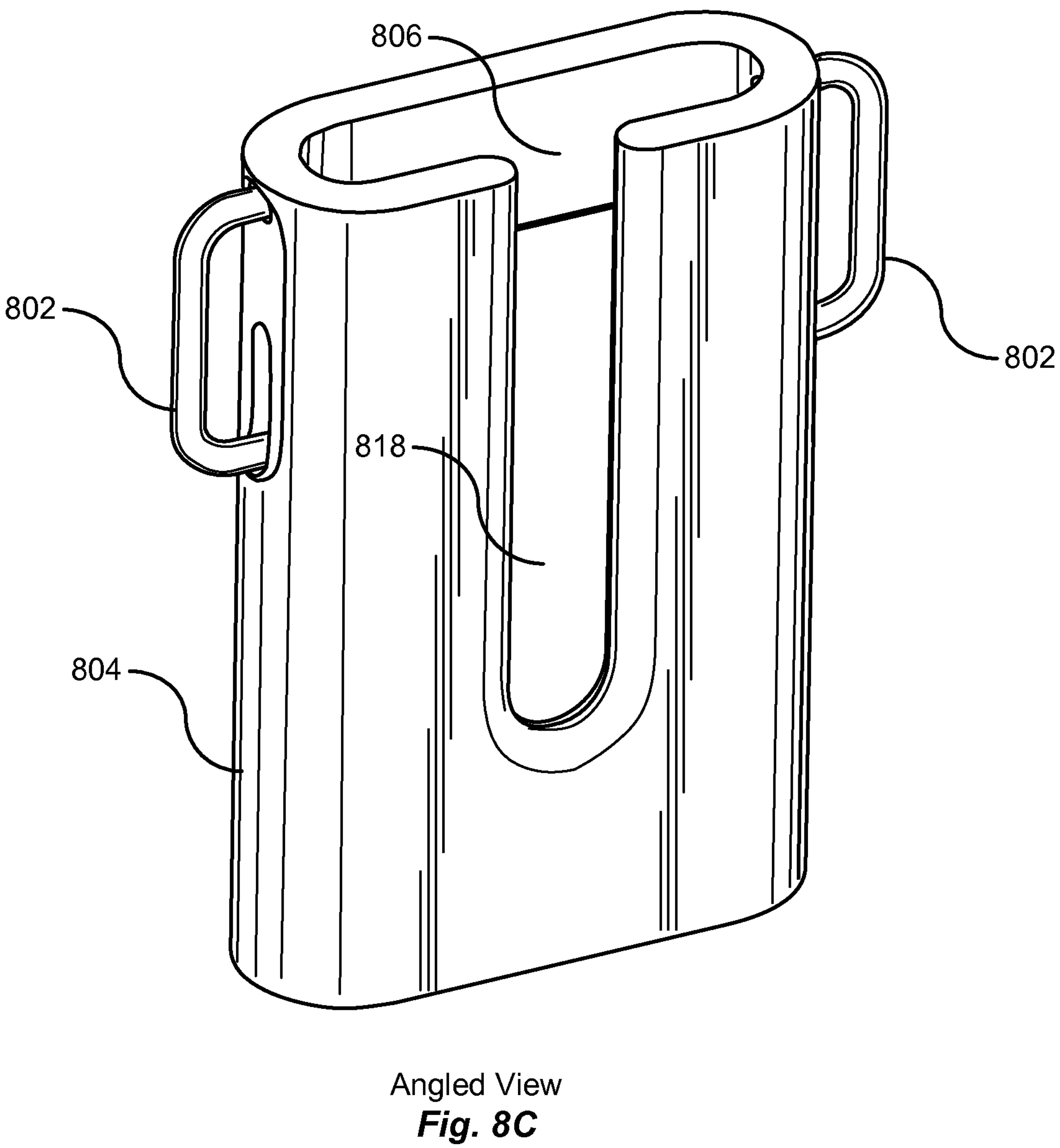
FIG. 8C illustrates an angled view of the exemplary unlocking tool shown in FIG. 8A.
Figure 8D:
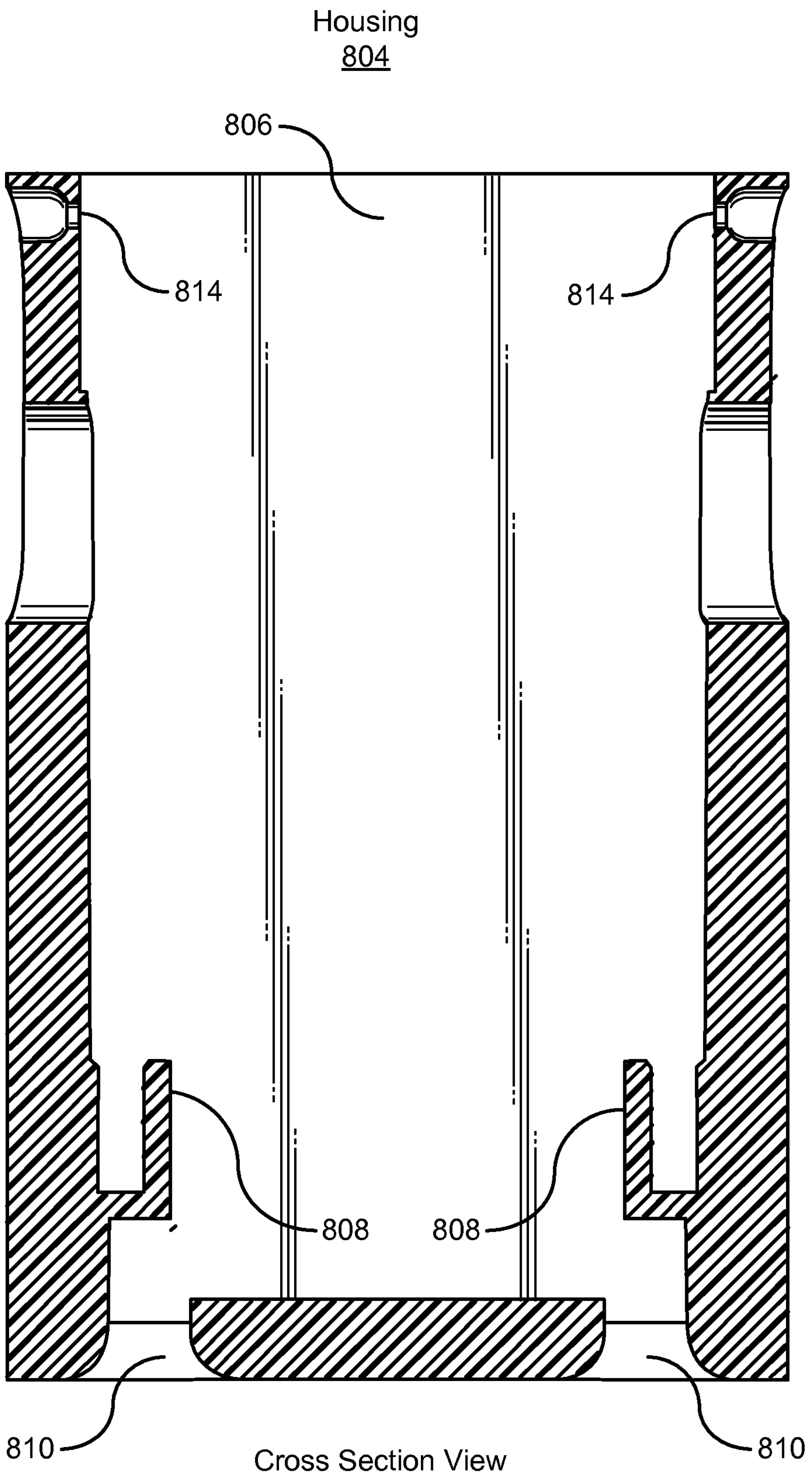
FIG. 8D illustrates a cross section view of a housing of the exemplary unlocking tool shown in FIG. 8A.
Figure 8E:
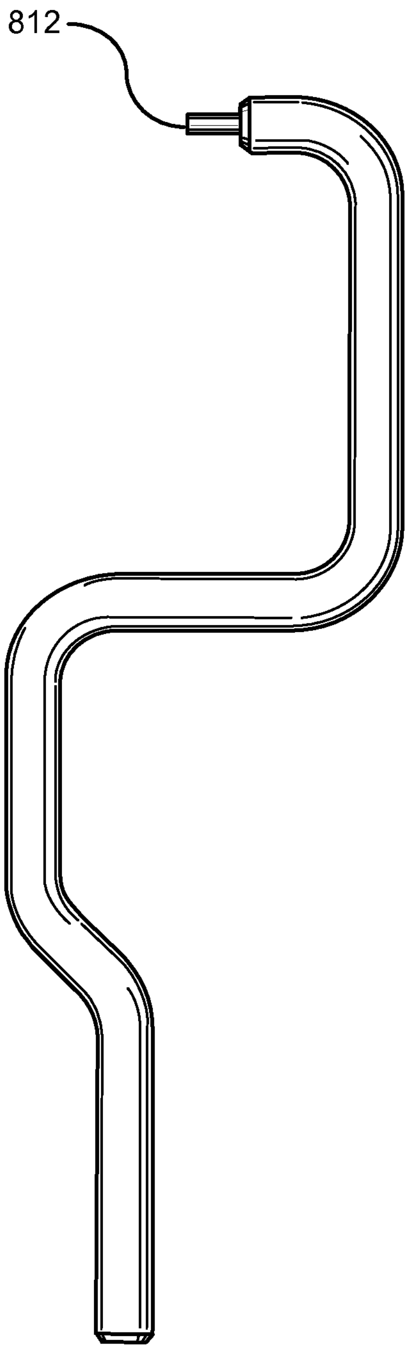
FIG. 8E illustrates a front view of a user initiation portion of the exemplary unlocking tool shown in FIG. 8A.

FIG. 8B illustrates a bottom view of unlocking tool 800. In particular, FIG. 8B shows bottom openings 810, which can be used with a lanyard to enable unlocking tool 800 to be conveniently carried. FIG. 8C illustrates an angled view of unlocking tool 800. In particular, FIG. 8C shows user initiation portions 802, housing 804 and cavity 806. In addition, FIG. 8C shows a front opening 818. FIG. 8D illustrates a cross section view of housing 804 of unlocking tool 800. As show in FIG. 8D, housing 804 can include side openings 820. The side openings 820 can include a length a least several times greater than its width. FIG. 8E illustrates a front view of a user initiation portion 802 of unlocking tool 800.

It will be appreciated that the cables, connectors, unlocking tools, and portable electronic devices shown in FIGS. 3-8 are illustrative and that variations and modifications are possible. For example, certain modules can be removed, added, altered, changed, combined, etc. Illustratively, cable 300 can include a female receptacle connector instead of a male plug connector.

It will be further appreciated that the cables, connectors, unlocking tools, and portable electronic devices shown in FIGS. 3-8 can be adapted to be compatible with other types of connectors (e.g., Firewire connectors, Ethernet connectors, HDMI connectors, eSATA connectors, power connectors, display connectors, etc.). Also, as new connector types are developed, the aforementioned cables, connectors, unlocking tools, and portable electronic devices can also be adapted to be used with those types.

Figure 9:
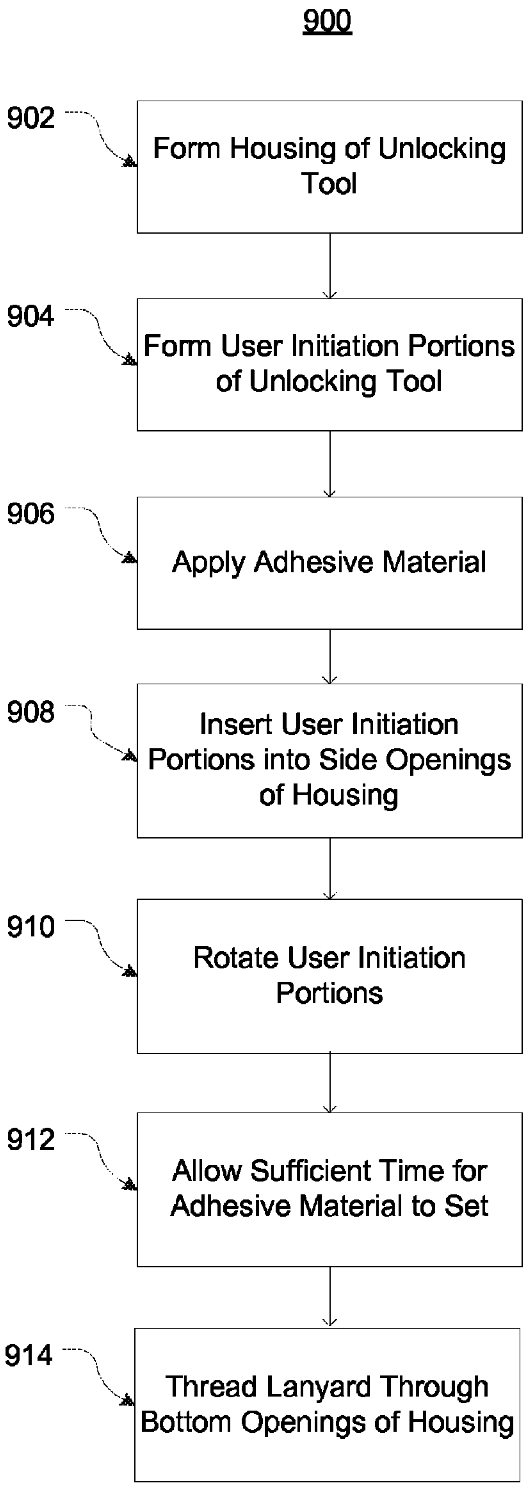
FIG. 9 illustrates a block flow diagram of a process for assembling an unlocking tool according to one embodiment of the present invention.

Examples of processes that can be used to assemble an unlocking tool and to use an unlocking tool will be described. FIG. 9 is a flow diagram of a process 900 for manufacturing and assembling an unlocking tool (e.g., unlocking tool 800 of FIG. 8A) according to one embodiment of the present invention. At block 902, housing 804 of unlocking tool 800 can be formed through a suitable injection molding process. At block 904, user initiation portions 802 can be machined through a suitable machining process. At block 906, an adhesive material, such as glue or epoxy, can be placed within channels 808 of housing 804.

Figure 10A:
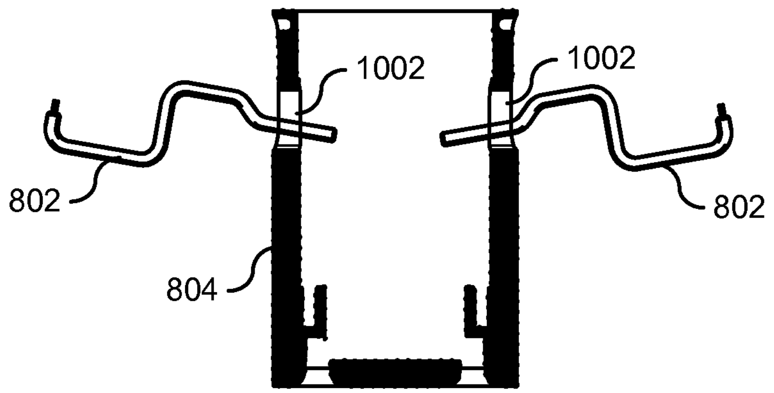
FIGS. 10A-10C illustrate the assembly of an unlocking tool according to one embodiment of the present invention.

At block 908, user initiation portions 802 can be moved through the side openings of housing 804. In particular, an end of each user initiation portion 802 can be passed horizontally or substantially horizontally through the side openings of housing 804. Illustratively, FIG. 10A shows user initiation portions 802 being moved through side openings 1002 of housing 804. As shown in FIG. 10A, the end of an individual user initiation portion that is first moved through the side openings is the end opposite to the end where the user initiation portion's pin is located.

Figure 10B:
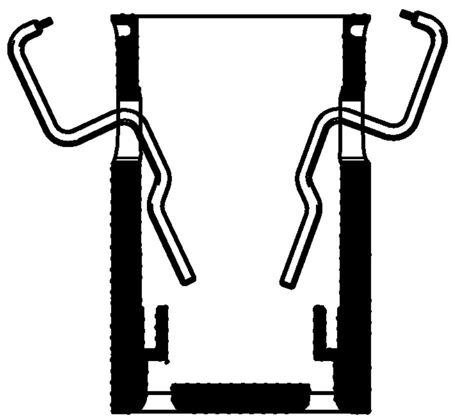
Figure 10C:
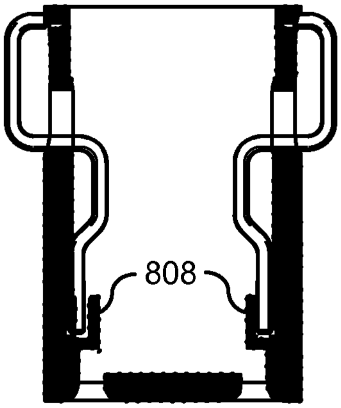

At block 910, the user initiation portions 802 can be rotated and moved in a downward direction such that the user initiation portions can be vertically positioned. Illustratively, FIG. 10B shows user initiation portions 802 as the portions are rotated into a vertical position. Upon being fully rotated and moved downward, the user initiation portions can enter channels 808 of housing 804. In some embodiments, the user initiation portions can be "snapped" into place with channels 808. FIG. 10C shows user initiation portions fully rotated into the vertical position. By placing user initiation portions 802 into channels 808, the user initiation portions can be adhered to housing 804.

At block 912, a sufficient amount of time is permitted to pass in order for the adhesive material to set. At block 914, a lanyard can be threaded through the bottom openings of housing 804 in order to enable the unlocking tool to be conveniently carried. For example, a user can carry the unlocking tool by wearing the lanyard around his or her neck. As another example, a user can carry the unlocking tool by attaching the lanyard to a belt loop.

Figure 11:
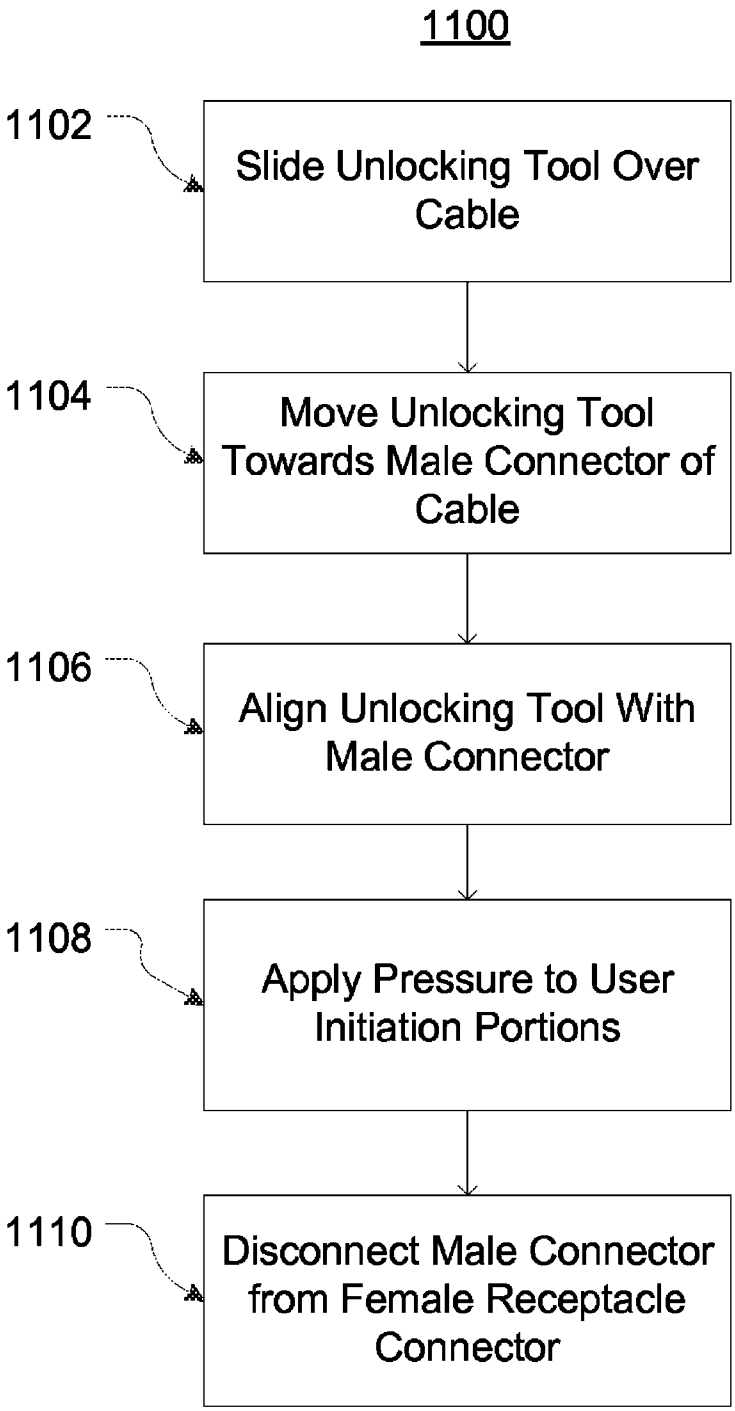
FIG. 11 illustrates a block flow diagram of a process for disengaging a male plug connector from a female receptacle connector according to one embodiment of the present invention.

FIG. 11 is a flow diagram of a process 1100 for disengaging a male plug connector (e.g., male plug connector 400 of FIG. 4A) from a female plug connector using an unlocking tool (e.g., unlocking tool 800 of FIG. 8A) according to one embodiment of the present invention.

At block 1102, unlocking tool 800 can be slid over the cabling portion of a cable. For example, unlocking tool 800 can be moved over the cabling portion such that the cabling portion is placed within the cavity of unlocking tool 800. In some embodiments, the cabling portion can enter the cavity through the top of unlocking tool 800. The cabling portion can additionally exit the cavity through the front opening of unlocking tool 800. At block 1104, the unlocking tool can be moved along the cabling portion towards the male plug connector (e.g., male plug connector 400 of FIG. 4A) of the cable. Upon reaching the male plug connector, unlocking tool 800 can receive the male plug connector through the top of the tool.

Figure 12A:
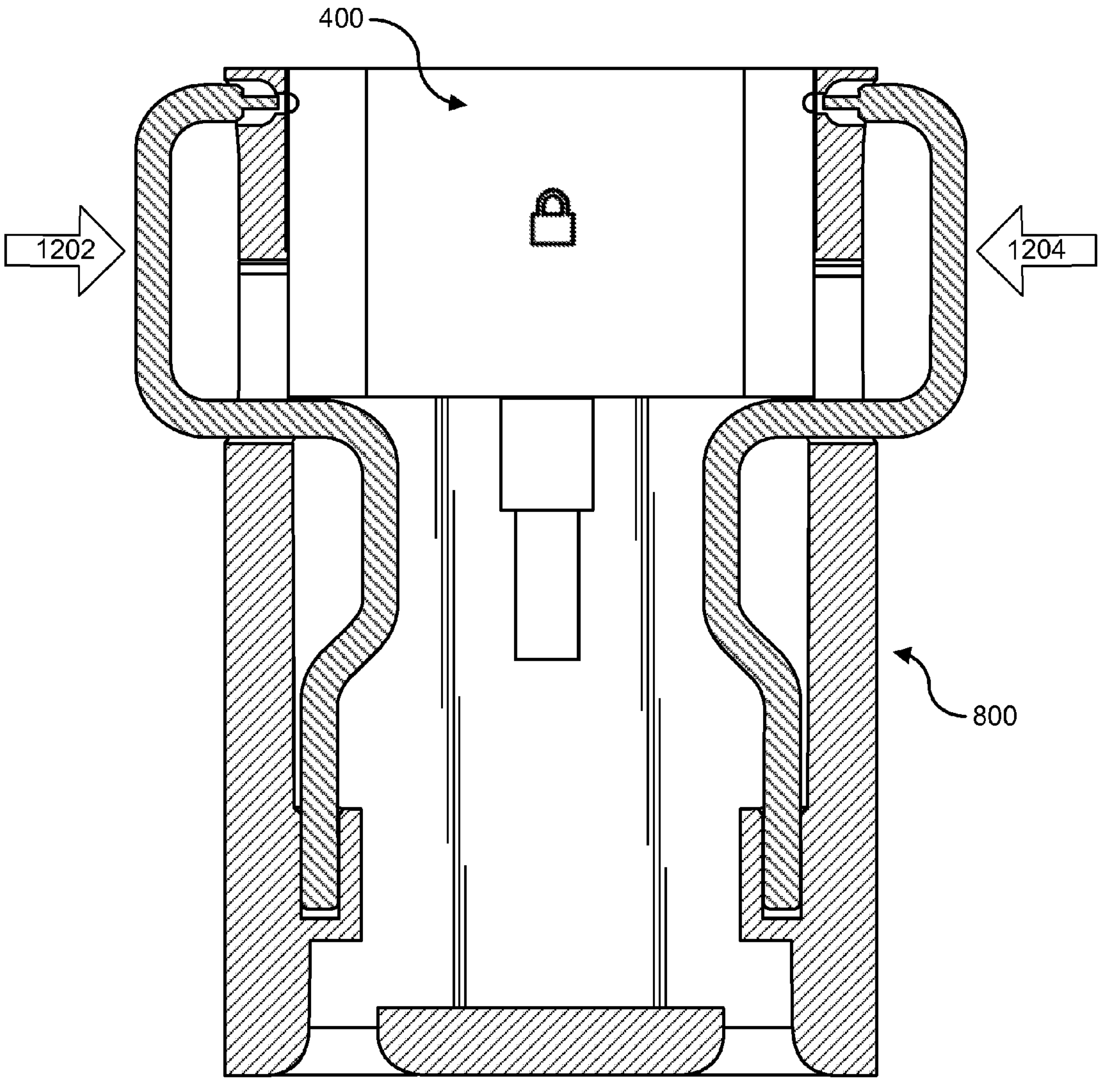
FIG. 12A illustrates a cross section view of an exemplary unlocking tool with an exemplary male plug connector according to one embodiment of the present invention.

At block 1106, the unlocking tool can be aligned with the male plug connector. In particular, unlocking tool 800 can be moved until portions of the user initiation portions (e.g., portions 816 of FIG. 8A) of the unlocking tool contact the male plug connector. Such contact can prevent the male plug connector from moving further into the cavity of unlocking tool 800, and can act to vertically align the access pathways of the male plug connector with the pins of unlocking tool 800. FIG. 12A, for example, shows unlocking tool 800 aligned with male plug connector 400. As shown in FIG. 12A, the male plug connector can be prevented from moving further into the cavity of unlocking tool 800 by the user initiation portions. As also shown in FIG. 12A, the access pathways of the male plug connector can be aligned with the pins of the user initiation portions of unlocking tool 800.

Figure 12B:
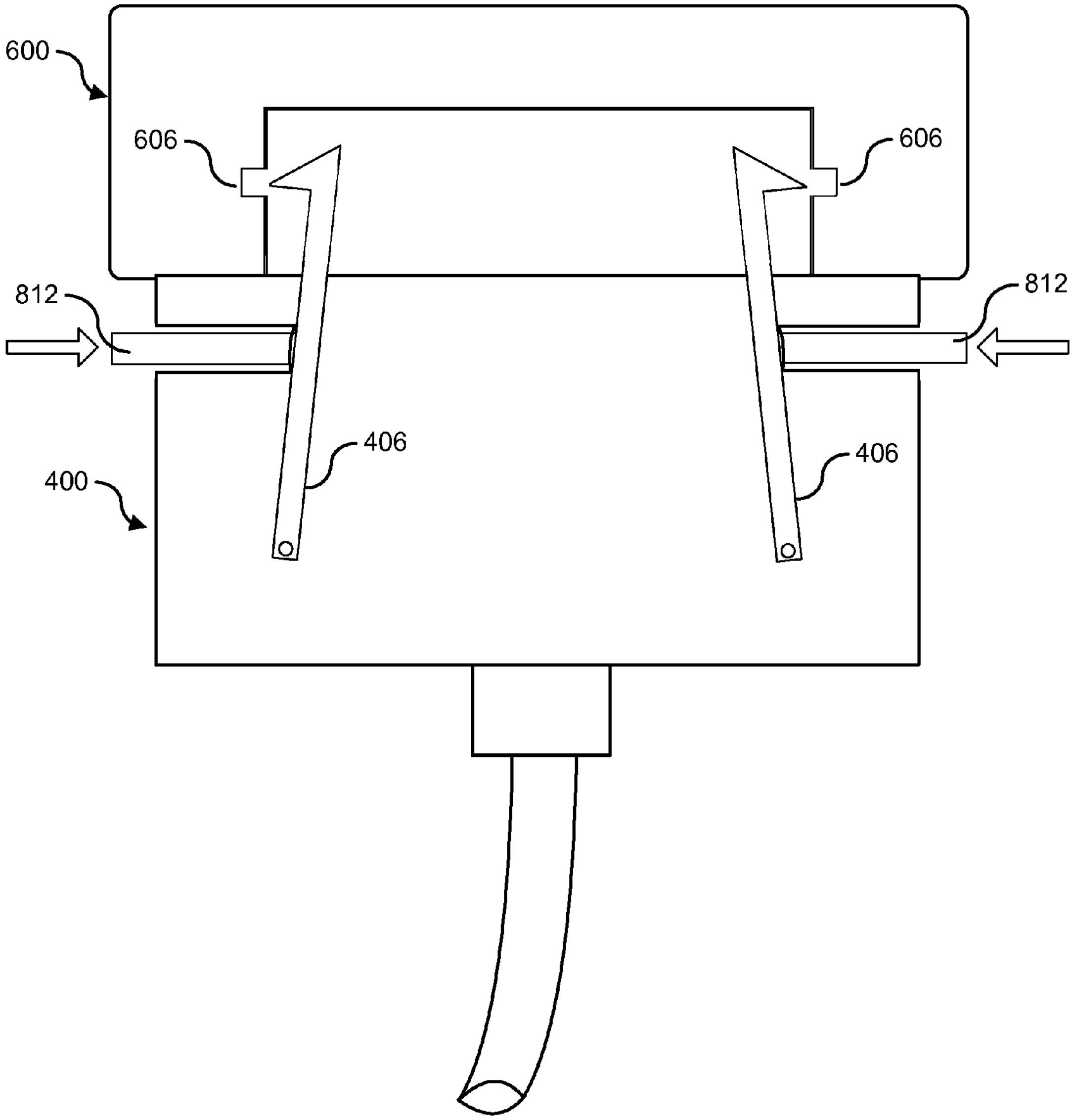
FIG. 12B illustrates a cross section view of an exemplary male plug connector as the connector is disengaged from a female receptacle connector according to one embodiment of the present invention.

At block 1108, pressure or a force can be applied to the user initiation portions of unlocking tool 800. For example, a user can apply pressure using his or her thumb and index finger. Referring again to FIG. 12A, arrows 1202 and 1204 show the areas where pressure can be applied to the user initiation portions. The pressure can cause the pins of the user initiation portions to enter the access pathways of the male plug connector such that the hooks of the male plug connector can be disengaged from a female receptacle connector. Illustratively, FIG. 12B shows a cross section view of a male plug connector as the connector is being disengaged from a female receptacle connector. As shown in FIG. 12B, pins 812 of unlocking tool 800 can contact hooks 406 of male plug connector 400 such that the hooks are moved away from the inner cavities 606 of female receptacle connector 600. As a result, the male plug connector can be freely removed or disconnected from the female receptacle connector.

What is claimed is:

1. A tool for disengaging a plug connector mated with a corresponding receptacle connector, the tool comprising:

a housing having a front, a back and first and second side surfaces formed there between that combine to form a longitudinally extending cavity, the cavity having an opening at a first end of the housing;

a first pair of openings that extend through the first side surface and a second pair of openings that extend through the second side surface, wherein the first and second pairs of openings mirror each other and each include a first opening near the first end and a second opening spaced apart from the first opening towards a second end of the housing, opposite the first end;

a first wire form module having a first end positioned within the cavity, a u-shaped portion that extends out of the cavity between the first and second openings on the first side surface, and a second end that extends into the first opening on the first side surface; and a second wire form module having a first end positioned within the cavity, a u-shaped portion that extends out of the cavity between the first and second openings on the second side surface, and a second end that extends into the first opening on the second side surface;

wherein a force can be asserted on the u-shaped portion of each of the first and second wire form modules to press the second end of each wire module into the cavity.

2. The tool set forth in claim 1 wherein each wire form module includes an s-shaped portion with one curve of the portion forming the u-shaped portion that extends between the first and second openings and a second curve of the s-shaped portion positioned within the cavity between the u-shaped portion and the first end of the wire module.

3. The tool set forth in claim 1 wherein the front of the housing includes an opening centrally located between the first and second sides that extends longitudinally from the opening at the first end of the housing towards the second end of the housing.

4. The tool set forth in claim 1 wherein the housing includes a generally rectangular cross section with rounded corners at both its outer and interior surfaces.

5. The tool set forth in claim 1 wherein the second opening in each of the first and second pairs of openings is a slot having a length at least several times its width.

6. The tool set forth in claim 1 wherein the housing further includes an end surface at the second end of the housing, wherein the end surface includes third and fourth openings extending into the cavity.

7. The tool set forth in claim 6 further comprising a lanyard looped through the cavity between the third and fourth openings of the end surface.

8. The tool set forth in claim 1 wherein the cavity includes first and second channels formed on opposing interior surfaces of the first and second side surfaces, respectively, each of the first and second channels being positioned between the second opening formed on its respective side surface and the second end of the housing.

9. The tool set forth in claim 8 wherein the first openings of the first and second pairs each has a larger diameter opening at an outer surface of the first or second side surfaces, and a smaller diameter opening at an interior surface of the first or second side surfaces.

10. The tool set forth in claim 9 wherein the second end of each of the first and second wire form modules includes a pin that extends into the smaller diameter opening at the interior surface of the first or second side surfaces.

11. The tool set forth in claim 10 wherein the pin in each of the first and second wire form modules includes a diameter that is smaller than other portions of the wire form module.

* * * * *